United States Patent
Balasubramanian et al.

(10) Patent No.: US 12,382,426 B2
(45) Date of Patent: Aug. 5, 2025

(54) POSITIONING AND BEAM ALIGNMENT BASED ON OPTICAL SENSING

(71) Applicant: QUALCOMM Incorporated, San Diego, CA (US)

(72) Inventors: Anantharaman Balasubramanian, San Diego, CA (US); Kapil Gulati, Belle Mead, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 17/931,071

(22) Filed: Sep. 9, 2022

(65) Prior Publication Data

US 2024/0089904 A1  Mar. 14, 2024

(51) Int. Cl.
*H04W 64/00* (2009.01)
*G01S 13/58* (2006.01)

(52) U.S. Cl.
CPC ......... *H04W 64/003* (2013.01); *G01S 13/587* (2013.01)

(58) Field of Classification Search
CPC ...... H04W 64/003; G01S 13/587; G01S 5/16; G01S 5/0284; H04B 7/0695
See application file for complete search history.

(56) References Cited

U.S. PATENT DOCUMENTS

| | | | |
|---|---|---|---|
| 12,096,392 B2 * | 9/2024 | Nam | H04W 4/027 |
| 2021/0184748 A1 * | 6/2021 | Luo | H04W 52/143 |
| 2023/0337269 A1 * | 10/2023 | Rao | H04B 7/0695 |

FOREIGN PATENT DOCUMENTS

| | | |
|---|---|---|
| WO | 2022006410 A1 | 1/2022 |
| WO | 2022046474 A1 | 3/2022 |
| WO | WO-2022225499 A1 * | 10/2022 |

OTHER PUBLICATIONS

Partial International Search Report—PCT/US2023/069314—ISA/EPO—Oct. 27, 2023.
International Search Report and Written Opinion—PCT/US2023/069314—ISA/EPO—Feb. 9, 2024.
Nister D., "An Efficient Solution to the Five-Point Relative Pose Problem", IEEE Transactions on Pattern Analysis and Machine Intelligence, vol. 26, No. 6, Jun. 2004, 17 pages.
OpenCV: "FAST Algorithm for Corner Detection", Retrieved on Feb. 28, 2024, 3 Pages.
Tyagi D., "Introduction to FAST (Features from Accelerated Segment Test)", Medium, Jan. 2, 2019, 12 Pages.
Wikipedia: "Scale-invariant Feature Transform", Wikipedia The Free Encyclopedia, Retrieved on Feb. 28, 2024, 19 Pages.

(Continued)

*Primary Examiner* — Siu M Lee
(74) *Attorney, Agent, or Firm* — Thien T. Nguyen

(57) ABSTRACT

Techniques for using optical sensing by wireless network nodes to assist with positioning of user equipment (UE) are provided. In some embodiments, such techniques may include sending first configuration information to the UE, the first configuration information indicative of how optical sensory data is to be obtained with the UE; receiving the optical sensory data from the UE; and based at least on the optical sensory data received from the UE, determining angular information regarding wireless transmissions between at least one wireless network node and the UE.

26 Claims, 14 Drawing Sheets

(56) References Cited

OTHER PUBLICATIONS

Wikipedia: "Essential Matrix", Wikipedia The Free Encyclopedia, Retrieved on Feb. 28, 2024, 7 Pages.
Wikipedia: "Harris Corner Detector", Wikipedia The Free Encyclopedia, retrieved on Feb. 28, 2024, 5 Pages.
Wikipedia: "Oriented FAST and Rotated Brief", Wikipedia The Free Encyclopedia, Retrieved on Feb. 28, 2024, 1 Page.
Wikipedia: "Perspective-n-Point", Wikipedia The Free Encyclopedia, Retrieved on Feb. 28, 2024, 5 Pages.

* cited by examiner

POSITIONING AND BEAM ALIGNMENT BASED ON OPTICAL SENSING

BACKGROUND

1. Field of Disclosure

The present disclosure relates generally to the field of wireless communications and computer vision, and more specifically to using optical signals (for example, visual information) obtained by network devices to position a User Equipment (UE) or to determine beams between wireless network devices.

2. Description of Related Art

Visual odometry allows determination of a position or an orientation of a device based on images or other optical information. In one application, visual odometry can involve comparing image frames (e.g., in a video sequence) to infer a trajectory of an ego vehicle, which refers to a vehicle that contains sensors that perceive the environment around the vehicle. The trajectory of the ego vehicle may be expressed in a camera coordinate system or translated to world coordinates.

BRIEF SUMMARY

In one aspect of the present disclosure, a method of assisting positioning of a user equipment (UE) is disclosed. In some embodiments, the method includes sending first configuration information to the UE, the first configuration information indicative of how optical sensory data is to be obtained with the UE; receiving the optical sensory data from the UE; and based at least on the optical sensory data received from the UE, determining angular information regarding wireless transmissions between at least one wireless network node and the UE.

In another aspect of the present disclosure, an apparatus of a wireless communication network is disclosed. In some embodiments, the apparatus includes one or more network interfaces; memory; and one or more processors communicatively coupled to the one or more network interfaces and the memory, and configured to: send first configuration information to a user equipment (UE), the first configuration information indicative of how optical sensory data is to be obtained with the UE; receive the optical sensory data from the UE; and based at least on the optical sensory data received from the UE, determine angular information regarding wireless transmissions between at least one wireless network node and the UE.

In another aspect of the present disclosure, a method of beam alignment with a user equipment (UE) is disclosed. In some embodiments, the method includes receiving first configuration information from a network entity, the first configuration information indicative of how optical sensory data is to be obtained with the UE; obtaining the optical sensory data with a sensor of the UE; and based at least on the optical sensory data, obtaining angular information regarding wireless transmissions between at least one wireless network node and the UE.

In another aspect of the present disclosure, a user equipment (UE) is disclosed. In some embodiments, the UE includes one or more network interfaces; memory; a sensor; and one or more processors communicatively coupled to the one or more network interfaces, the sensor, and the memory, and configured to: receive first configuration information from a network entity, the first configuration information indicative of how optical sensory data is to be obtained with the UE; obtain the optical sensory data with the sensor of the UE; and based at least on the optical sensory data, obtain angular information regarding wireless transmissions between at least one wireless network node and the UE.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
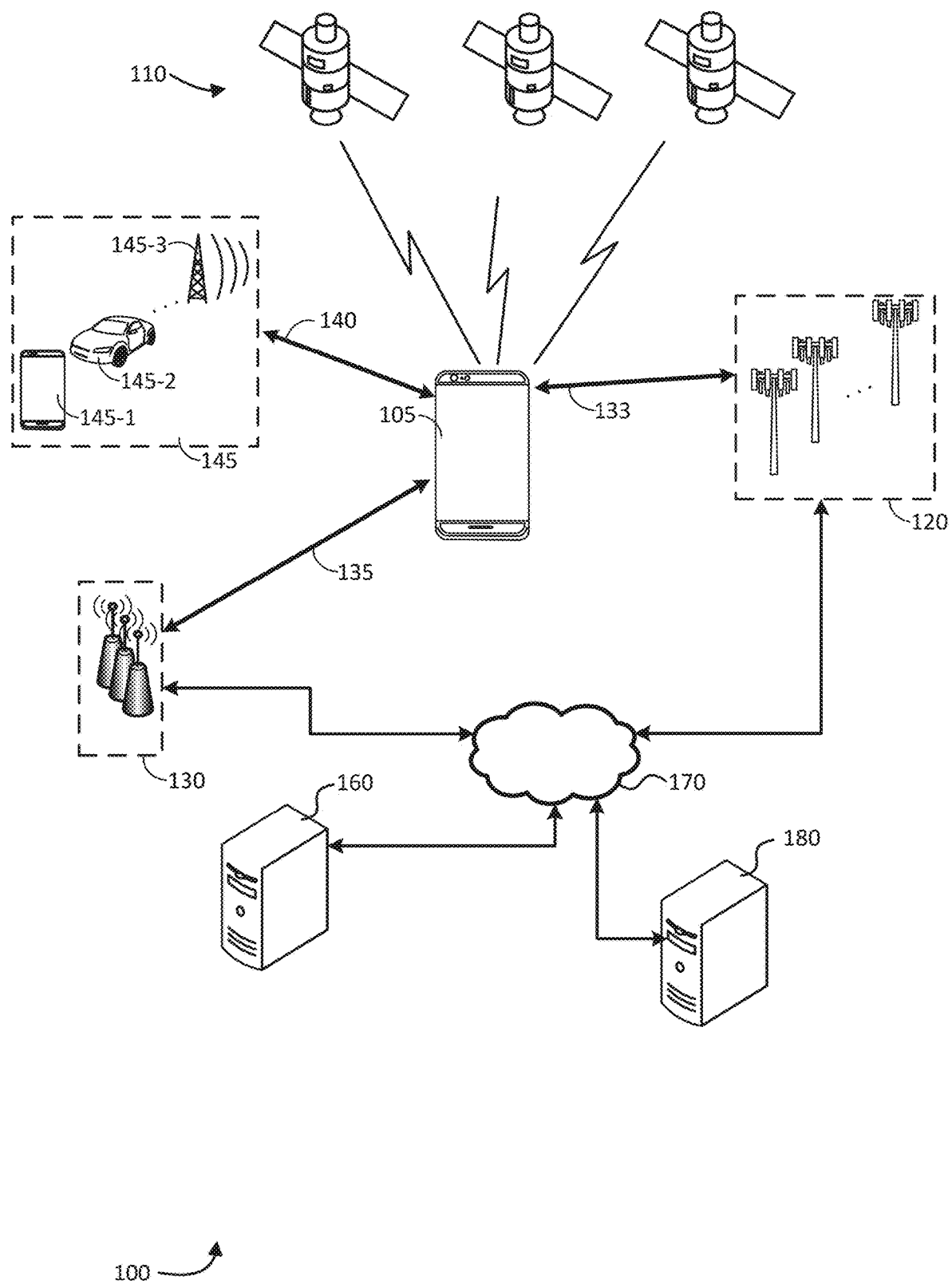
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may absolute location determination, relative location determination, ranging, or a combination thereof. Such positioning may include and/or be based on timing, angular, phase, or power measurements, or a combination thereof (which may include RF sensing measurements) for the purpose of location or sensing services.

The following describes positioning of a wireless network device or determination of optimal beams between wireless network devices based on a type of visual odometry.

Inferring trajectory of an ego vehicle may involve comparing keypoints detected over consecutive frames and finding correspondence between the keypoints. Keypoints are spatial locations or points of interest in an image. In some cases, keypoints may be pixels in an image that can be tracked from frame to frame, such as corner points of a feature of a building. Keypoints can also have associated descriptors that help with the tracking process. A keypoint and its descriptor together are referred to as a feature of an image. Keypoints and features can be helpful in finding the change in pose or orientation of a sensor (e.g., camera) between the consecutive image frames. For example, two-dimensional displacement of five or more stationary keypoints or features detected and tracked across two camera images is sufficient to recover the three-dimensional displacement of the sensor.

When performing ranging or positioning between two wireless network devices (e.g., between a base station and UE), it is valuable to know how the wireless network devices are placed with respect to each other. In some implementations, this knowledge (e.g., by a wireless network entity) would enable a receiver (e.g., UE or base station) to have information to perform the ranging or positioning, information such as angular information, including, e.g., information on an angle of arrival (AoA) that the receiver can expect to receive from a transmitter (e.g., base station or UE).

To that end, it is helpful to determine a unit vector connecting (describing distance and/or direction between) the wireless network devices so that angular orientation and other angular information (e.g., expected AoA, azimuth, elevation) can be inferred, even in a non-line-of-sight (NLOS) environment, e.g., where physical obstructions are present between the wireless network devices. It is further helpful to exchange signals between wireless network devices to enable acquisition of this information and performance of enhanced positioning. As will be described in greater detail, in one example scenario, a position of an ego vehicle (via a UE co-located with the ego vehicle) can be determined even with a NLOS signal path with a base station.

Additional details will follow after an initial description of relevant systems and technologies.

FIG. 1 is a simplified illustration of a positioning system 100 in which a UE 105, location server 160, and/or other components of the positioning system 100 can use the techniques provided herein for assisting positioning of a UE 105 or beam alignment with a UE 105, according to embodiments. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the UE 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the UE 105 to perform code-based and/or carrier-based positioning, which can be highly accurate. Additionally or alternatively, satellites 110 may be utilized for Non-Terrestrial Network (NTN)-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the UE 105, such as infrared signals or other optical technologies.

Mobile devices 145 may comprise other UEs communicatively coupled with a cellular or other mobile network (e.g., network 170). When one or more other mobile devices 145 comprising UEs are used in the position determination of a particular UE 105, the UE 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and UE 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., UE 105) may be facilitated using measurements from one or more anchor devices (e.g., mobile devices 145).

According to some embodiments, such as when the UE 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
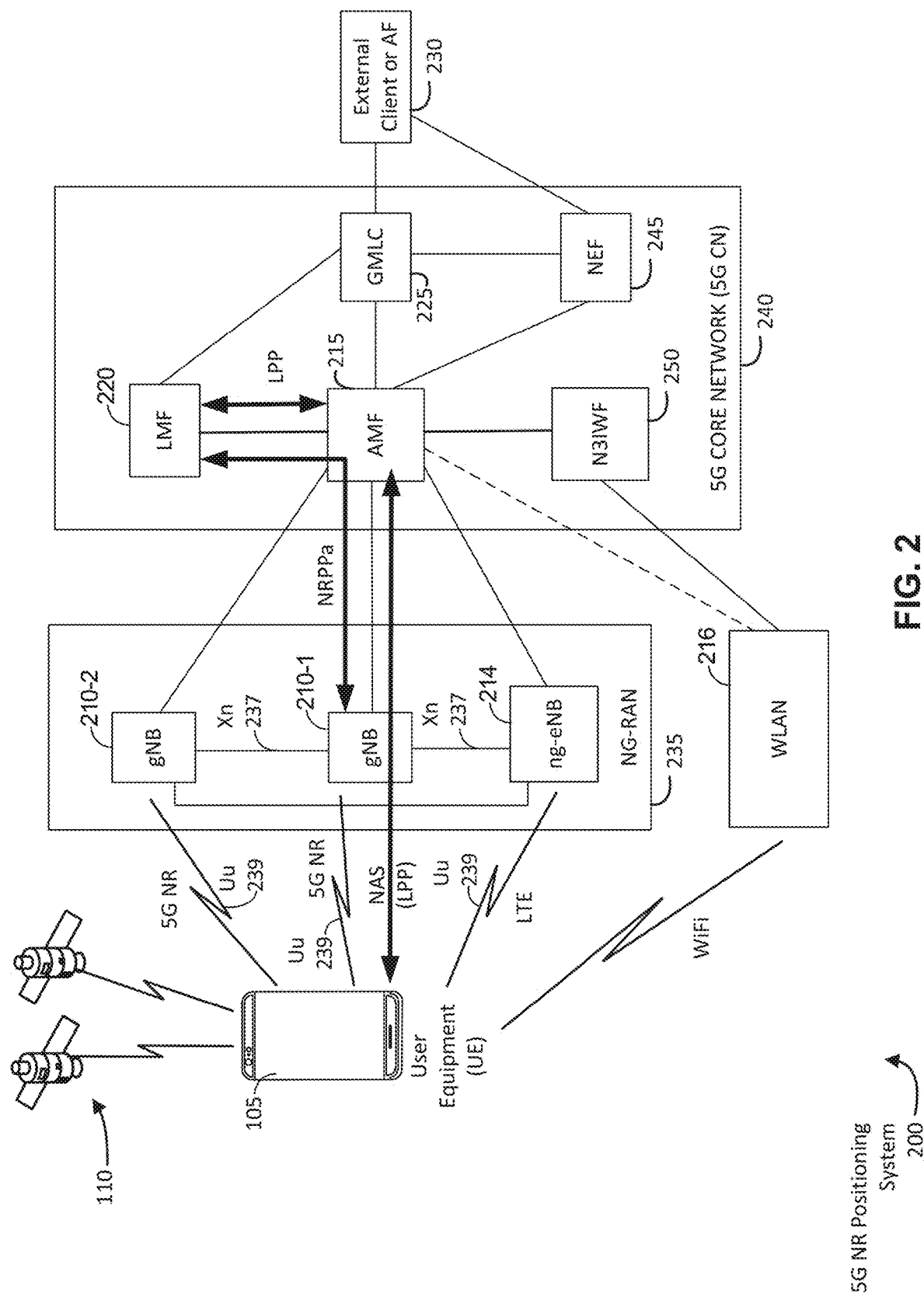
FIG. 2 is a diagram of a 5th Generation (5G) New Radio (NR) positioning system, illustrating an embodiment of a positioning system (e.g., the positioning system of FIG. 1) implemented within a 5G NR communication network.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of satellites 110, gNBs 210, ng-eNB s 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNB s 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNB s 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNB s supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
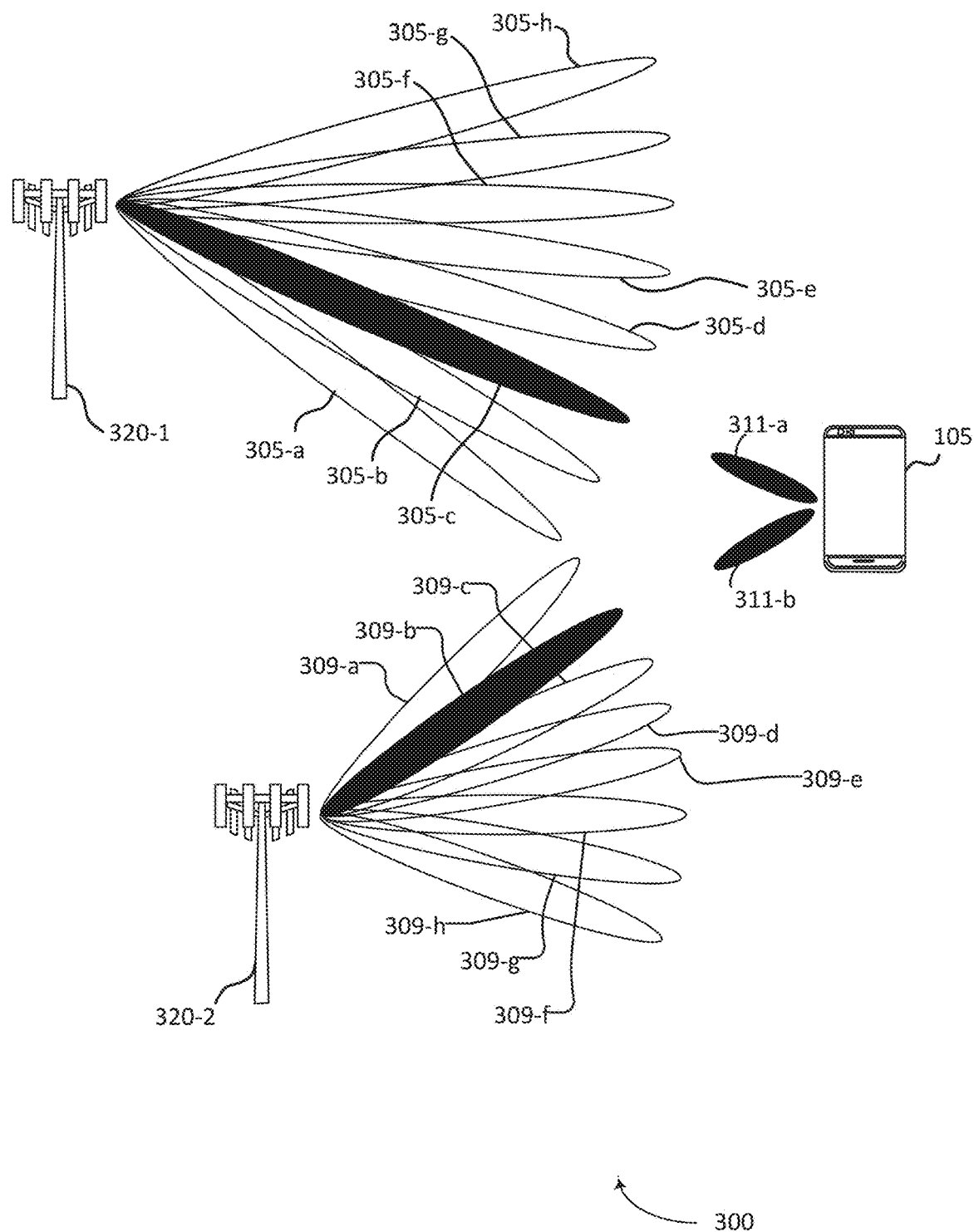
FIG. 3 is a diagram showing an example of how beamforming may be performed, according to some embodiments.

FIG. 3 is a diagram illustrating a simplified environment 300 including two base stations 320-1 and 320-2 (which may correspond to base stations 120 of FIG. 1 and/or gNBs 210 and/or ng-eNB 214 of FIG. 2) with antenna arrays that can perform beamforming to produce directional beams for transmitting and/or receiving RF signals. FIG. 3 also illustrates a UE 105, which may also use beamforming for transmitting and/or receiving RF signals. Such directional beams are used in 5G NR wireless communication networks. Each directional beam may have a beam width centered in a different direction, enabling different beams of a base station 320 to correspond with different areas within a coverage area for the base station 320.

Different modes of operation may enable base stations 320-1 and 320-2 to use a larger or smaller number of beams. For example, in a first mode of operation, a base station 320 may use 16 beams, in which case each beam may have a relatively wide beam width. In a second mode of operation, a base station 320 may use 64 beams, in which case each beam may have a relatively narrow beam width. Depending on the capabilities of a base station 320, the base station may use any number of beams the base station 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, the UE 105 may be capable of using different numbers of beams, which may also correspond to different modes of operation, signal types, etc.

In some situations, a base station 320 may use beam sweeping. Beam sweeping is a process in which the base station 320 may send an RF signal in different directions using different respective beams, often in succession, effectively "sweeping" across a coverage area. For example, a base station 320 may sweep across 120 or 360 degrees in an azimuth direction, for each beam sweep, which may be periodically repeated. Each direction beam can include an RF reference signal (e.g., a PRS resource), where base station 320-1 produces a set of RF reference signals that includes Tx beams 305-a, 305-b, 305-c, 305-d, 305-e, 305-i f, 305-g, and 305-h, and the base station 320-2 produces a set of RF reference signals that includes Tx beams 309-a, 309-b, 309-c, 309-d, 309-e, 309-f, 309-g, and 309-h. As noted, because UE 105 may also include an antenna array, it can receive RF reference signals transmitted by base stations 320-1 and 320-2 using beamforming to form respective receive beams (Rx beams) 311-a and 311-b. Beamforming in this manner (by base stations 320 and optionally by UEs 105) can be used to make communications more efficient. They can also be used for other purposes, including taking measurements for position determination (e.g., AoD and AoA measurements).

Visual Odometry Techniques

Figure 4:
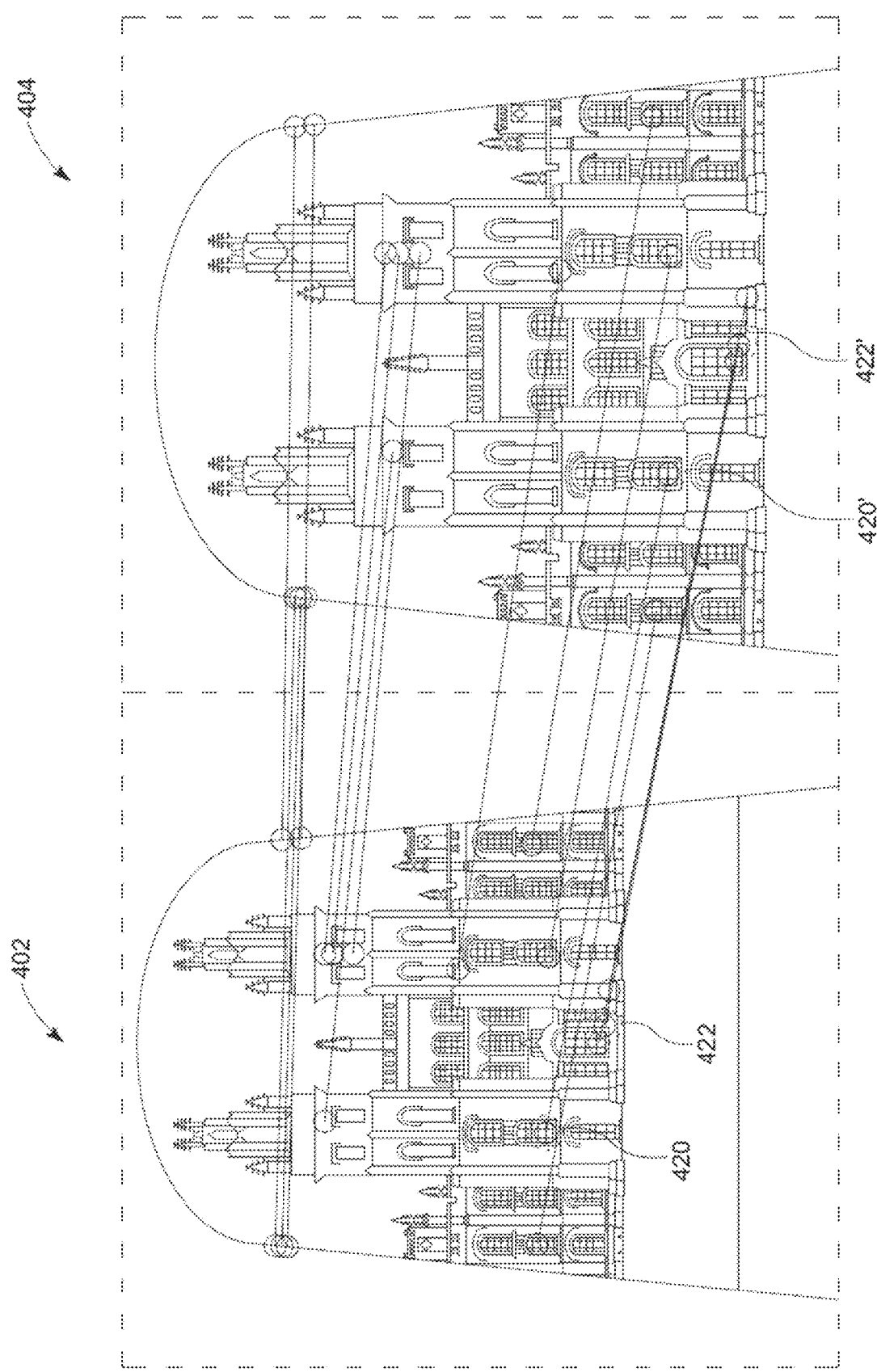
FIG. 4 depicts a comparison of keypoints between two example images.
Figure 5:
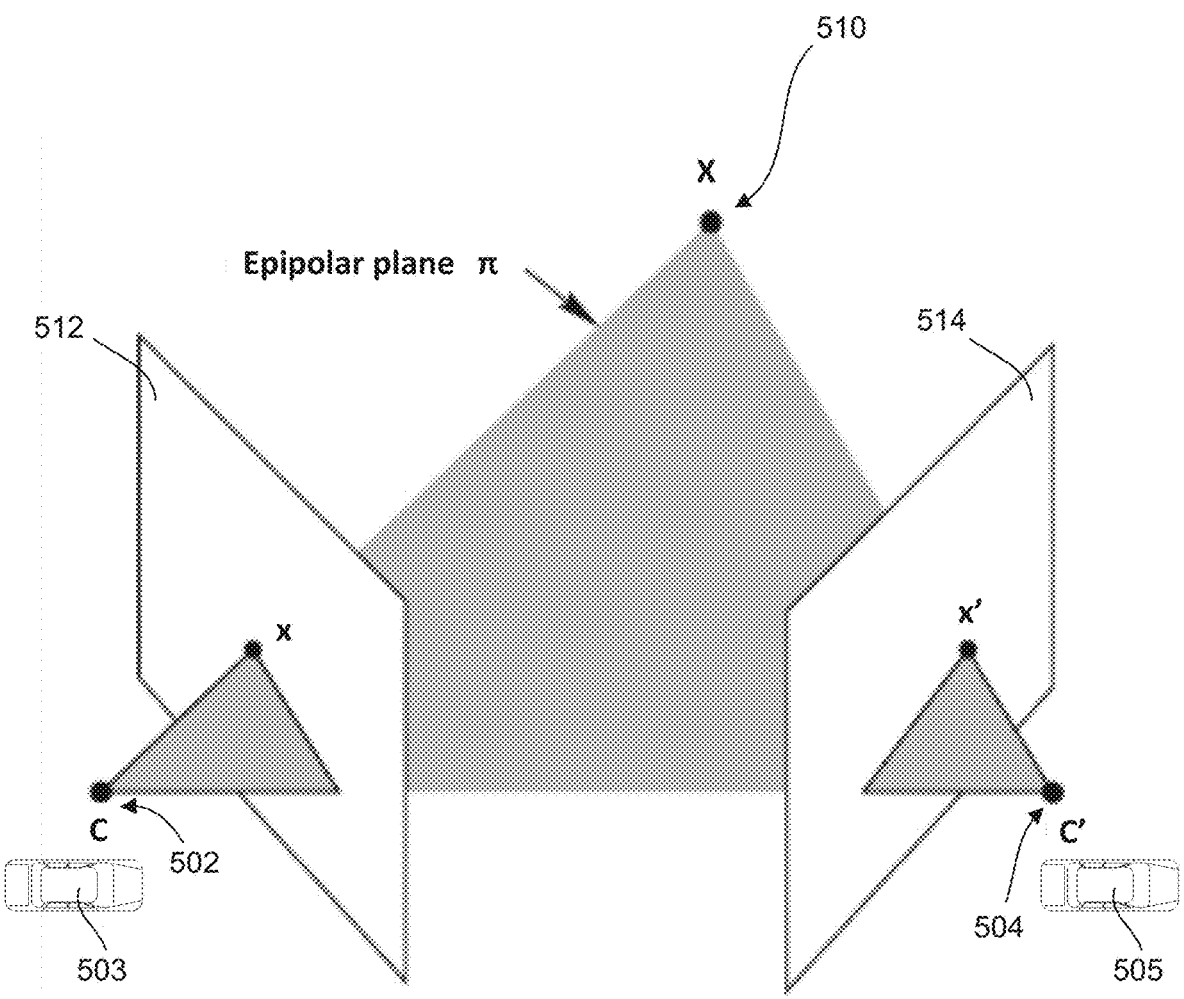
FIG. 5 shows an example of relative placements of cameras and a point X in the environment.

FIGS. 4 and 5 illustrate bases of techniques used to determine salient information, which may be used to, e.g., determine a position of a UE or determine beams between wireless network devices.

Various techniques known in the relevant art may be used to detect keypoints within an image. Examples of such techniques include, but are not limited to, Features from Accelerated Segment Test (FAST), speeded up robust features (SURF), scale-invariant feature transform (SIFT), Oriented FAST and Rotated BRIEF (Binary Robust Independent Elementary Features) (ORB), and Harris corner detector. Any of these techniques may be used to detect keypoints of interest, e.g., corners, a peak of a window structure. In some approaches, an image patch from an image can be represented by a two-dimensional grid of pixels to determine the keypoint.

FIG. 4 depicts a comparison of keypoints between two example images 402 and 404. Example image 402 may have been obtained via a first sensor (e.g., a first camera), and example image 404 may have been obtained via a second sensor (e.g., a second camera). In specific implementations, other types of spatial sensors may be used, e.g., radar sensor, lidar sensor. The use of a radar or radar sensor as described herein may include RF sensing, and a radar sensor may comprise a specialized RF sensor and/or a wireless communication interface (e.g., 1330 in FIG. 13, 1430 in FIG. 14).

Example image 402 includes a first example keypoint 420 and a second example keypoint 422. Example image 404 includes a first corresponding example keypoint 420' and a second corresponding example keypoint 422'. The first corresponding example keypoint 420' corresponds to the same keypoint or feature as the first example keypoint 420. The second corresponding example keypoint 422' corresponds to the same keypoint or feature as the second example keypoint 422. That is, when a substantially same object (e.g., a building) is captured by two different cameras, the same features (windows, corners, peaks, etc.) can be identified between them. For example, as shown in FIG. 4, the first example keypoint 420 and the first corresponding example keypoint 420' may correspond to a portion of a window, and the second example keypoint 422 and the second corresponding example keypoint 422' may correspond to a portion of an arch. Various other keypoints within the example images 402 and 404 are indicated via points and lines connecting corresponding points in FIG. 4.

Based on keypoints, relative camera orientations (e.g., poses, angles) can be inferred using various methods known in the relevant art. As one example, an eight-point algorithm using eight or more keypoints to form and factor an essential matrix (also known as a fundamental matrix) that relates corresponding points in stereo images, may be used. As another example, Nister's five-point solution to determining the essential matrix may be used to estimate relative camera motion.

Referring now to FIG. 5, an example of relative placements of cameras 502, 504 and a point X in the environment 510 is shown. Each of points C and C' is the optical axis of a camera (502 or 504), which in some scenarios may each be associated with an object, e.g., UE, vehicle, UE co-located with a vehicle. This can provides stereo vision of the point X in the environment 510, visualized by an epipolar plane formed by the points X, C and C'.

Consider a scenario in which the objects are vehicles 503 and 505, and a UE is co-located with each vehicle, making the location of the vehicles substantially at points C and C'. The vehicles 503 and 505, using respective cameras associated therewith, may sense the environment around them. For example, an image sensed by a first vehicle 503 may be the first example image 402, and an image sensed by a second vehicle 505 may be the second example image 404, as depicted in FIG. 4.

From the corresponding points connected by lines, using the theory of essential matrix decomposition (e.g., eight-point or five-point methods noted above), it is possible to calculate the relative orientation, and relative translation (to a scale) between two objects. In the current scenario, keypoints may be determined within images sensed by vehicles 503 and 505 (e.g., using a technique as noted above such as FAST), and from the keypoints, relative orientations of the vehicles 503 and 505 may be determined. Examples of keypoints associated with the point X in the environment 510 (e.g., a feature of an object) are at point x on an image plane 512, and point x' on an image plane 514, points x and x' corresponding respectively to points C and C'. Point x (a keypoint) may be identified where a line connecting point C and the point X in the environment 510 intersects the image plane 512. This line and the image plane 512 need not be perpendicular to each other. Point x' (a keypoint corresponding to keypoint x) may be identified where a line connecting point C' and the point X in the environment 510 intersects the image plane 514.

Relative orientations may refer to the linear direction from one point (e.g., from C or C') the other point (e.g., to C' to C). Even if the actual locations of C and C' may not be known, it is possible in this way to determine a vector (e.g., a unit vector) along the direction CC'. This provides useful information for knowing where objects (e.g., vehicles 503, 505) are relative to each other in their own coordinate system.

Example scenarios follow to illustrate positioning use cases and a beam-alignment use case for the visual odometry techniques described above.

Figure 6:
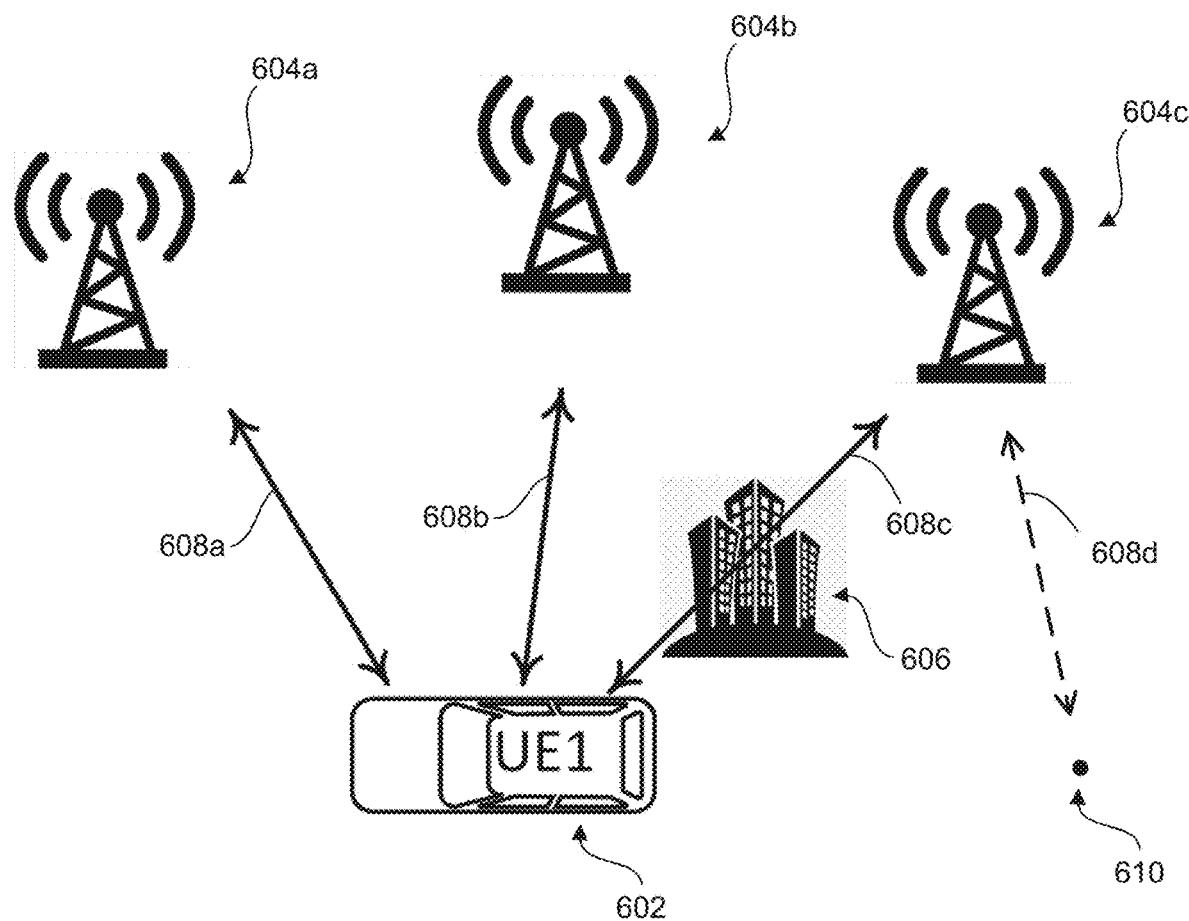
FIG. 6 illustrates a simplified diagram of an example positioning scenario, in which a UE is in a wireless network and configured to communicate with one or more base stations.

FIG. 6 illustrates a simplified diagram of an example positioning scenario, in which a UE 602 is in a wireless network and configured to communicate with one or more base stations 604a-604c. In this scenario, the UE 602 may be able to wirelessly exchange signals with base stations 604a and 604b via wireless signal paths 608a and 608b. For example, UE 602 may be performing downlink or uplink positioning with one or more of the base stations 604a and 604b. A physical obstruction 606 may be present between the UE 602 and one of the base stations (604c), blocking a line-of-sight (LOS) signal path 608c, at least where the UE 602 is located. The physical obstruction 606 may be a building, a wall, or other object that blocks the signal path 608c.

Without signal path 608c available to UE 602, LOS positioning may be difficult or not be possible with the base station 604c. NLOS positioning may be difficult with wireless RF systems as it is not always possible to know signal propagation paths around obstacles for accurate positioning. However, NLOS positioning may be feasible or desirable using approaches that are described elsewhere herein (e.g., the UE may determine or estimate angular information such as an expected AoA). Alternatively, if the UE 602 traverses to another location (e.g., point 610), a signal path 608d may be available between the UE 602 and the base station 604c, and/or LOS signal paths may no longer be available between the UE 602 and the other base stations 604a, 604b, e.g., because of the physical obstruction 606.

Figure 7:
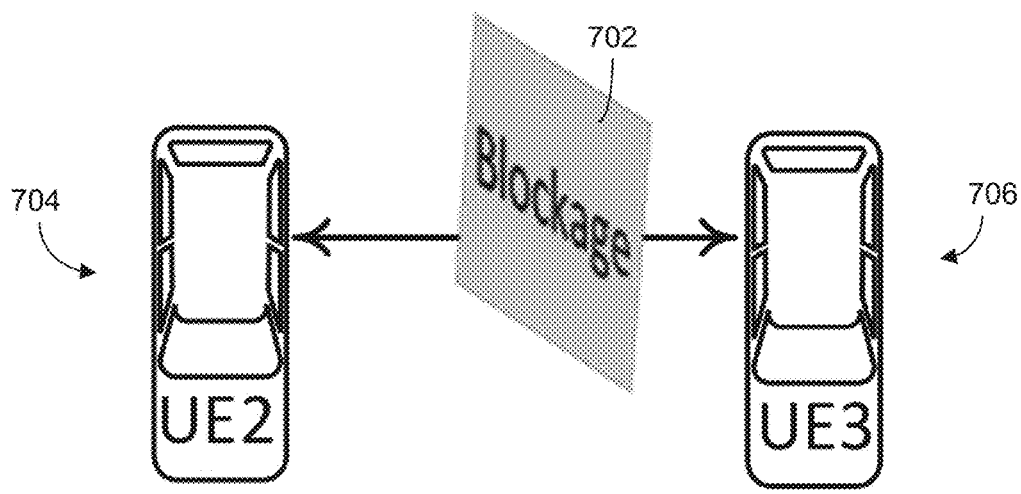
FIG. 7 illustrates a simplified diagram of another example positioning scenario, in which a physical obstruction is present between UEs.

FIG. 7 illustrates a simplified diagram of another example positioning scenario, in which a physical obstruction (e.g., blockage 702) is present between UEs 704 and 706. In this scenario, the UEs 704 and 706 may be performing sidelink ranging, but may be in NLOS of each other given their positions as shown because of the blockage 702.

Again, here, a receiver (e.g., UE 704) can infer angular information (e.g., an expected AoA, an azimuth, or an elevation) even though it may be in NLOS with a transmitter (e.g., UE 706). With this angular information known to the receiver, ranging and/or positioning can be performed between the UEs even in a NLOS environment.

As will be described herein, signals may be exchanged between endpoint wireless network devices (e.g., UE, base station, location server) to enable determination of information relating to and useful for the foregoing enhanced positioning, even without the knowledge of the location of any of the devices.

Figure 8:
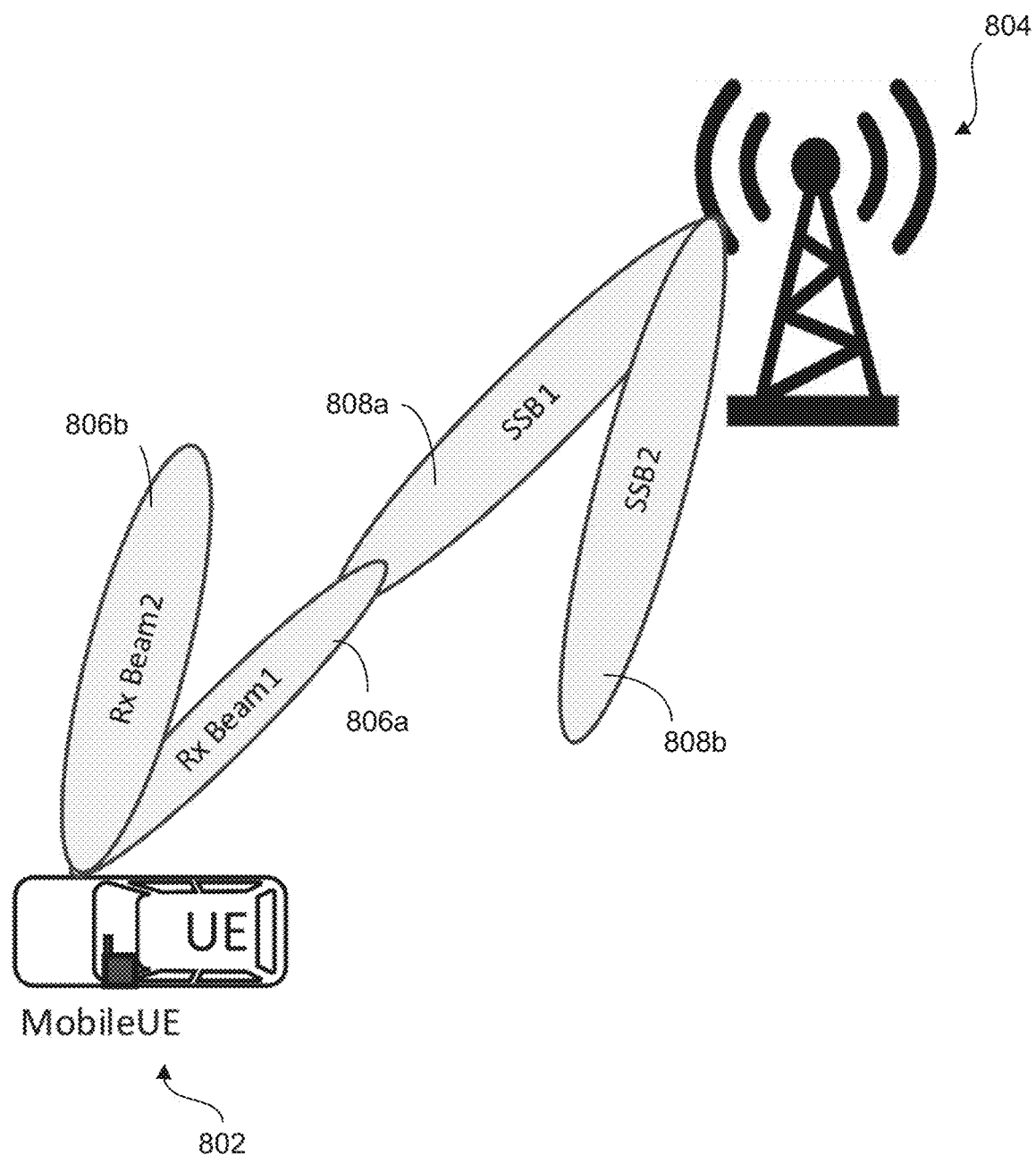
FIG. 8 illustrates a simplified diagram of an example beam-alignment scenario involving a UE and a base station.

FIG. 8 illustrates a simplified diagram of an example beam-alignment scenario involving a UE 802 and a base station 804. In this scenario, a UE 802 that is mobile (e.g., co-located with a vehicle) connecting to a base station may be determining the optimal transmit and receive beams for their communication. The conventional method is to use, e.g., an iterative P1 (beam sweep and selection), P2 (beam refinement and narrower sweep by transmitter), P3 (beam refinement by receiver) search procedure. Conventional beamforming of transmit and receive beams can be done using the sweeping procedures described with respect to FIG. 3.

However, if the UE 802 and/or the base station 804 is/are made aware the direction (including, e.g., azimuth or elevation) of where the other entity is using a unit vector connecting the UE 802 and the base station 804 (e.g., determined using an essential matrix as discussed above), it becomes possible for these endpoint devices to autonomously choose the correct transmit beam and receive beam without an exhaustive search, as may be done conventionally, even if the UE 802 and the base station 804 are not aware of the locations of each other.

For example, a UE 802 installed on a vehicle can use the direction information (e.g., based on the unit vector) to determine the correct subset of receive beams to measure. In the scenario shown in FIG. 8, the optimal receive beam may be receive beam 806a, and the optimal transmit beam may be transmit beam 808a. In some scenarios, one or few candidate beams may be selected given the direction information, e.g., two receive beams 806a, 806b and two transmit beams 808a, 808b. These beams may have been greatly narrowed from numerous beams that conventional beamforming methods start with. Contrast with transmit beams 305-a, 305-b, 305-c, 305-d, 305-e, 305-f, 305-g, and 305-h and receive beams 309-a, 309-b, 309-c, 309-d, 309-e, 309-f, 309-g, and 309-h of FIG. 3. From the reduced candidate beams, the beams 806a and 808a may be selected as optimal. Since there is no additional searching of beams, this can advantageously lead to enhanced power savings for, e.g., the UE 802. In addition, the UE 802 in a vehicle can utilize the prior information not only for itself but for (e.g., provided to or utilized for) other mobile UE(s) inside or otherwise co-located with the vehicle for power saving.

To effectuate the foregoing beam alignment, signals may be exchanged between endpoint wireless network devices (e.g., UE and base station) so that each of these wireless network devices can determine information relating to and associated with it, e.g., installed or affixed to the base station 904, or proximate to and communicative with the base station 904.

In some embodiments, at arrow 912 of the call flow 900, the UE 906 may send a signal to the location server 902, requesting assistance data "on demand." The assistance data may include AoA information to be used for positioning, and may be obtained at, e.g., arrow 924b.

In some cases, this on-demand request may be optional, e.g., if the location server 902 is aware of a schedule for providing the assistance data. As will be noted below, the location server 902 may already have visual features from a prior transmission, particularly since the base station 904 and/or its sensor are likely static, and there is likely no change over time in intrinsic or extrinsic parameters of the sensor associated with the base station 904.

An example information element "RequestAssistanceData" to signal the location server 902 may contain the following information:

TABLE 1

Example of an information element.

RequestAssistanceData-r9-IEs ::= SEQUENCE {
commonIEsRequestAssistanceData      CommonIEsRequestAssistanceData OPTIONAL,
a-gnss-RequestAssistanceData        A-GNSS-RequestAssistanceData OPTIONAL,
otdoa-RequestAssistanceData         OTDOA-RequestAssistanceData OPTIONAL,
epdu-RequestAssistanceData          EPDU-Sequence OPTIONAL,
VisualFeatureAoA AssistanceData     AoA AssistanceData OPTIONAL
... } useful for transmit and receive beam selection without the knowledge of the location of any of the devices.

Positioning Solutions

Using the information that can be determined with above-described methods, downlink and uplink positioning of a UE can be performed. In one embodiment, a location server (e.g., LMF) may configure wireless network devices such as a UE, a base station, or a RSU to provide optical keypoints and/or their associated features of the environment sensed by a sensor (e.g., a camera) associated with the UE and a sensor (e.g., a camera) associated with the base station. In some variants, the sensor's intrinsic parameters may also be requested.

Upon receiving keypoints and/or features from, e.g., the UE and the base station, the location server may determine the translation unit vector between the UE and the base station using a visual odometry technique described above. Unit vector CC' of FIG. 5 may be an example of the unit vector. From the unit vector, the location may then determine assistance information such as angular information, including, e.g., the AoA for the UE and base station.

For uplink positioning, the location server may signal the expected AoA from the UE to all the base stations involved in positioning the UE. For downlink positioning, the location server may signal the expected AoA from every base station to the UE.

Figure 9:
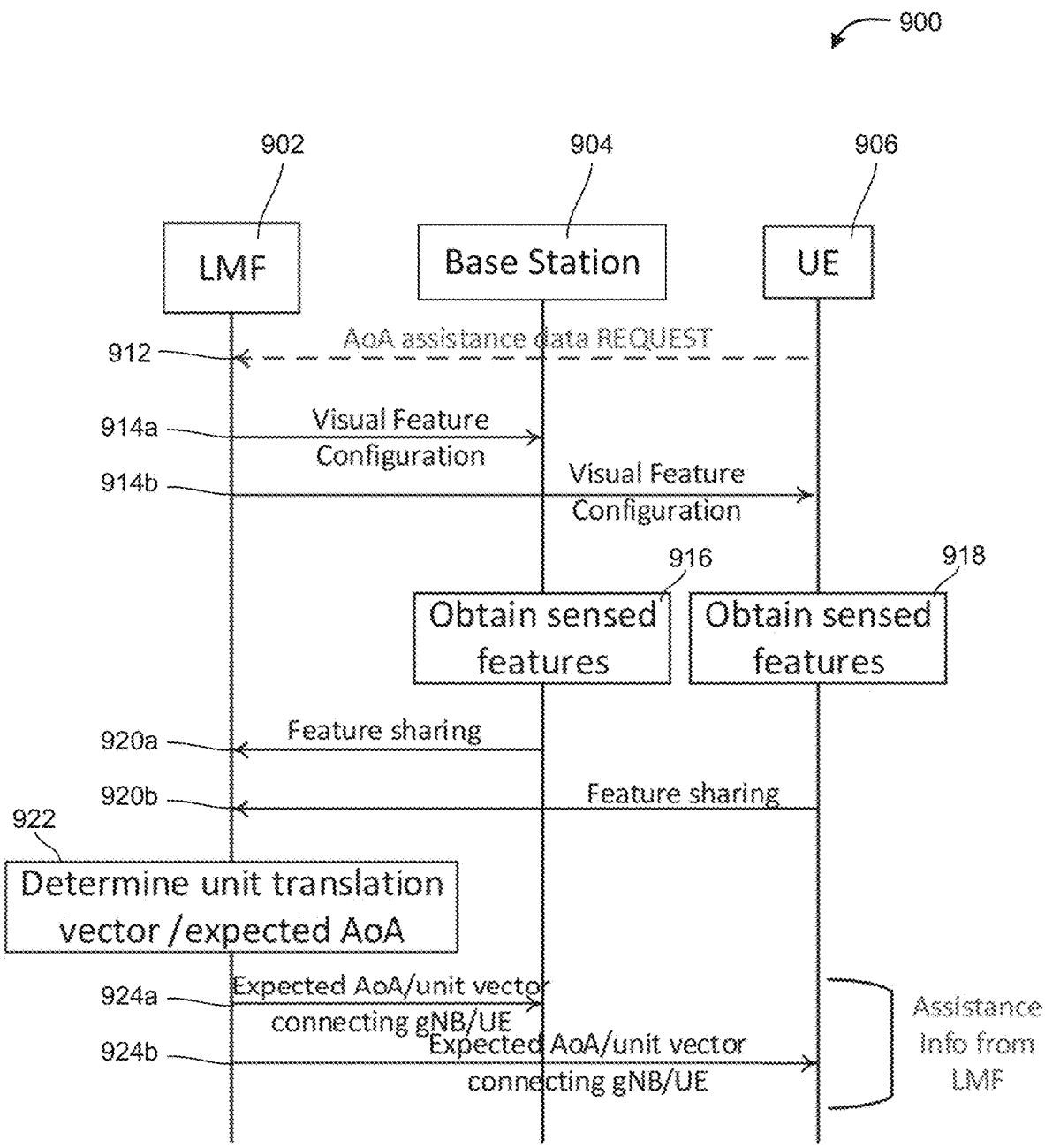
FIG. 9 is a call flow showing exchanges of signals among a location server, a base station, and a UE, according to some embodiments.

FIG. 9 is a call flow 900 showing exchanges of signals among a location server 902, a base station 904, and a UE 906, according to some embodiments. According to various embodiments, the location server 902 may be an LMF, the base station 904 may be a gNB or in some cases an RSU, and the UE 906 may be a mobile UE or a UE co-located with a vehicle such that the vehicle or the UE 906 can obtain optical information such as images using a sensor such as a camera while the vehicle is moving. In some embodiments, the base station 904 may have a sensor (e.g., a camera) associated with it, e.g., installed or affixed to the base station 904, or proximate to and communicative with the base station 904.

In some implementations, the sensor and its sensor parameters may be tagged as static or dynamic, e.g., whether camera zoom and orientation are fixed or not (e.g., if mounted on a swiveling platform). Dynamic parameters may be indicated by embedding in the images themselves (e.g., metadata) or indicated separately. Whether a sensor parameter is static or dynamic can help the location server 902 correlate pixels across images that were taken in time, and predict where the corresponding pixels would be in future frames. This can then enhance matching the key points across images for better positioning.

In some embodiments, at arrows 914a and 914b, the location server 902 may send configuration information to configure the base station 904 and the UE 906. In some cases, the location server 902 may signal the base station 904 with the configuration information to provide visual features upon receiving a request from UE 906 at arrow 912. In some implementations, the configuration information may include one or more of: the keypoint detection method (Harris corner detector, FAST, SURF, etc.), number of keypoints and associated features to be provided, feature descriptor(s) for one or more of the keypoints, intrinsic parameters of the sensor (e.g., camera), or a combination thereof.

In some implementations, the configuration information may include the number of keypoints to be provided based on an intensity metric for each keypoint specified as the sharpness of a corner, e.g., as used in the Harris corner measure. For example, keypoints corresponding to the first N highest corners may be requested. In some cases, the requested keypoints may be uniformly sampled in the image space.

In some implementations, the configuration information may include information (e.g., optical information such as images, features) to be obtained by the base station 904 and the UE 906, e.g., sensed information such as images and/or sensor intrinsic parameters. In some implementations, the configuration information may include a request for the raw image or a compressed image itself.

In some implementations, the configuration information may include a request for current location information of the base station and/or the UE. Although locations of the base station and/or the UE are not necessary to perform the call flow 900, they may be relevant for confirmation of the unit vector (determined at block 922) or other purposes.

In some implementations, the configuration information may request the keypoints to be tagged as static or dynamic associated with a probability. For example, a building may be described as static and permanent, while a car on a road may be described as temporary). More generally, a classic semantic segmentation can be used to classify pixels in an image, thereby allowing every pixel to be associated with a class. In some cases, the class and/or probability may be a feature descriptor. This can help the location server 902 (or any other network device or node determining the keypoints) match the keypoints across the images more effectively, thereby enhancing positioning accuracy.

The signaling of the configuration by the location server 902 to the base station 904 (arrow 914a) may be performed through, for example, the NRPPa interface, and the signaling of the configuration by the location server 902 to the UE 906 (arrow 914b) may be performed through, for example, the LPP interface. In some implementations, each signaling may be performed on a periodic, semi-static (based on availability of resource elements (time-frequency resources)), or on-demand basis. As alluded to below, there may be less of a need for the base station 904 to obtain sensed features because the environment around the base station 904 is relatively static.

At block 916, the base station 904 may obtain sensed features. In some embodiments, one or more images may be obtained using a sensor (e.g., camera) associated with the base station 904, where the one or more images include features sensed by the camera. In some cases, a video may be captured using the camera. In some cases, one or more frames from a video may be extracted or obtained from the video.

In some embodiments, block 916 may not be performed in some subsequent or some previous performances of the call flow 900. While mobile objects such as vehicles, people, animals, etc. may change, and while lighting conditions may change throughout a day, the environment around the base station 904 is relatively static and does not change for the most part, since the base station 904 is typically stationary. In such cases of a stationary base station, where the extrinsic and/or intrinsic parameters of at least one sensor of the base station have not changed since the previously reported visual features, the base station 904 may indicate as such to the location server.

Thus, in some cases, unless it is known that the sensor associated with the base station 904 has changed orientation, optical axis, or location, the location server 902 may configure the base station 904 to capture optical information at a lower frequency or frames per second (periodically), e.g., compared to the UE 906, semi-statically, or only when configured to do so (on demand). In some cases, the sensed features may be stored for a period of time at the base station 904 or the location server 902 without configuring the base station 904 to capture more.

At block 918, the UE 906 may obtain sensed features. In some embodiments, one or more images or video may be obtained using a sensor (e.g., camera) associated with the UE 906, similar to the sensed features by the base station 904. The sensed features may be of the same points in the environment as those sensed by the base station 904 so as to enable keypoint detection and determination of a unit vector based on detected keypoints.

At arrows 920a and 920b, the location server 902 may receive the obtained optical information (e.g., sensed features) from the base station 904 and the UE 906.

At block 922, the location server 902 may determine a translation unit vector between locations of the base station 904 and UE 906, and may determine assistance information based on the unit vector. In some embodiments, the unit vector may be determined by (i) determining keypoints within the sensed features (e.g., images) from the base station 904 and the UE 906 (e.g., using methods such as FAST, as discussed above), (ii) determining relative sensor orientation (e.g., using methods such as eight- or five-point essential matrix decomposition, as discussed above), and (iii) determining the unit vector based on the relative sensor orientations. In particular, the unit vector indicates a direction from the base station 904 to the UE 906 and vice versa. Based on the unit vector, the location server 902 may determine assistance information. For example, the assistance information may include angular information, e.g., an expected AoA connecting the base station 904 and UE 906, since the unit vector indicates the direction between the base station 904 and UE 906. In some implementations, relative translation may also be determined to a scale along with the relative orientation.

At arrow 924a, the location server 902 may send the assistance information (e.g., expected AoA) and/or the unit vector to the base station 904, e.g., via NRPPa. At arrow 924b, the location server 902 may send the assistance information (e.g., expected AoA) and/or the unit vector to the UE 906, e.g., via LPP. With this assistance information, the UE 906 may perform downlink positioning with the base station 904, or the base station 904 may perform uplink positioning with the UE 906. Hence, in some cases, the call flow 900 may perform either arrow 924a or 924b to perform uplink or downlink positioning, while in other cases, both arrows 924a and 924b may be performed.

In some implementations, the foregoing call flow 900 may be applied to a first UE and a second UE for sidelink positioning (e.g., to use with the FIG. 5 scenario).

In cases where a network device such as the UE has multiple sensors or cameras, the UE may handle reporting of sensed features in different ways. As one example, the UE may report images or keypoints from each camera separately, as if each camera were the only camera available. As an alternate example, the UE may report one of the multiple images of multiple cameras, or keypoints identified in that image, since the keypoints being identified on the image would be substantially identical. The keypoints can be computed at the network device with multiple cameras (e.g., the UE) using the images from multiple cameras. The one reported image may be needed to identify and/or describe the keypoints in the image, towards which the range and/or direction may be reported. As another example, the UE may directly report the range and/or direction to a keypoint, assuming the keypoint can be identified by some descriptor without needing to send any image data, e.g., some well-known landmark building.

Moreover, in other implementations, the aforementioned approach can be applied with an optical sensor at other electromagnetic wave frequencies, e.g., radar or lidar, to perform keypoint matching across radar or lidar images.

Beam Alignment Solutions

In some embodiments, a UE and a base station may exchange optical information including keypoints and/or their associated features of the environment sensed by a sensor (e.g., a camera) associated with the UE and a sensor (e.g., a camera) associated with the base station. In some variants, the sensor's intrinsic parameters may also be requested. In some implementations, RRC signaling may be used to exchange the information between the UE and the base station.

In some embodiments, the UE and the base station may independently determine the translation unit vector between them. The UE and the gNB may determine assistance information such as angular information between them (e.g., AoD, AoA, azimuth, elevation) based on the inferred translation unit vector in their respective coordinates. Based on the above assistance information, the UE and the gNB may choose appropriate transmit and receive beams (without using conventional sweeping approaches). In some cases, the UE may use the assistance information to choose a dynamic beam list to measure for every transmit SSB.

Figure 10:
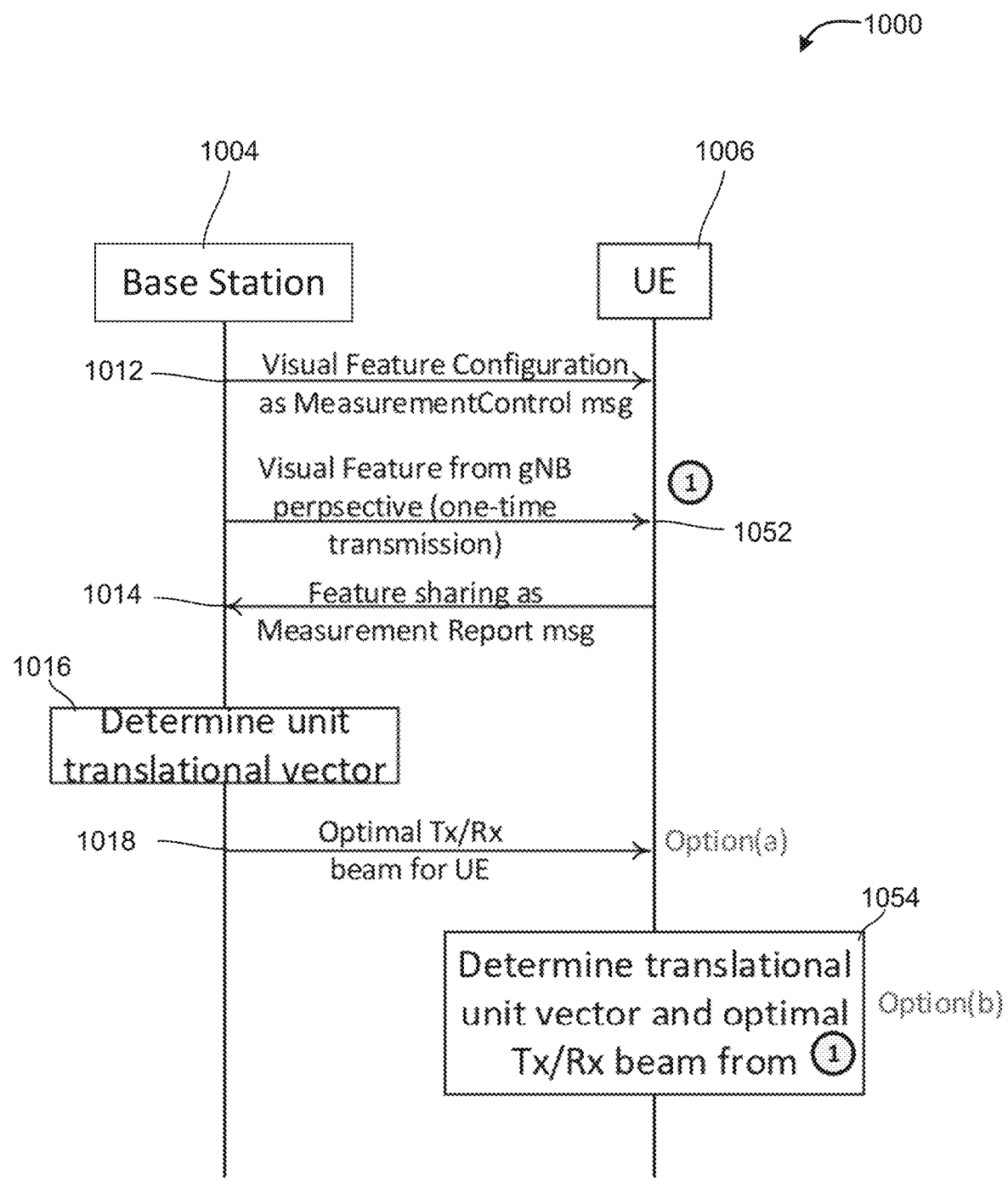
FIG. 10 is a call flow showing exchanges of signals between a base station and a UE, according to some embodiments.

FIG. 10 is a call flow 1000 showing exchanges of signals between a base station 1004 and a UE 1006, according to some embodiments. According to various embodiments, the base station 1004 may be a gNB or in some cases an RSU, and the UE 1006 may be a mobile UE or a UE co-located with a vehicle such that the vehicle or the UE 1006 can obtain optical information such as images using a sensor such as a camera while the vehicle is moving. In some embodiments, the base station 1004 may have a sensor (e.g., a camera) associated with it, e.g., installed or affixed to the base station 1004, or proximate to and communicative with the base station 1004.

In some embodiments, at arrow 1012 of the call flow 1000, the base station 1004 may send configuration information to the UE 1006 configure the UE 1006. In some implementations, the configuration information may include the types of information described elsewhere herein (one or more of keypoint detection method, feature descriptor, number of keypoints and associated features to be provided, intrinsic parameters of the sensor, etc.). In some implementations, the configuration information may include information (e.g., optical information such as images, features) to be obtained by the UE 1006, e.g., sensed information such as images and/or sensor intrinsic parameters.

In some implementations, the base station 1004 may configure the UE 1006 based on one or more of (i) periodic reporting with the period of reporting being specified (e.g., 1 second, 2 seconds), (ii) on-demand-based reporting, (iii) conditioned or triggered reporting where the triggering condition may be preconfigured, or a combination thereof. Trigger conditions may include one or more of (i) the self-orientation of the UE 1006 changing by more than threshold over a time window, (ii) the number of new objects detected by the UE 1006, e.g., compared to a previous frame being over a threshold (e.g., two or more new objects compared to previous frame), or a combination thereof.

At arrow 1014, the base station 1004 may receive the obtained optical information (e.g., sensed features) from the UE 1006, e.g., via RRC. In some embodiments, the obtained information may include one or more images that were obtained using a camera associated with the UE 1006. In some cases, a video may be captured using the camera. In some cases, one or more frames from a video may be extracted or obtained from the video.

At block 1016, the base station 1004 may determine a translation unit vector between locations of the base station 1004 and UE 1006, and may determine assistance information based on the unit vector. In some embodiments, the unit vector may be determined by (i) determining keypoints within the sensed features (e.g., images) from the base station 1004 and the UE 1006 (e.g., using methods such as FAST, as discussed above), (ii) determining relative sensor orientation (e.g., using methods such as eight- or five-point essential matrix decomposition, as discussed above), and (iii) determining the unit vector based on the relative sensor orientations. In particular, the unit vector indicates a direction from the base station 1004 to the UE 1006 and vice versa. Based on the unit vector, the base station 1004 may determine assistance information. For example, the assistance information may include angular information, e.g., an expected AoA connecting the base station 1004 and UE 1006, since the unit vector indicates the direction between the base station 1004 and UE 1006. As another example, the assistance information may include information regarding transmit beams and/or receive beams (e.g., candidate beams, or optimal transmit and/or receive beams). In some implementations, relative translation may also be determined to a scale along with the relative orientation.

At arrow 1018, the base station 1004 may send the assistance information and/or the unit vector to the UE 1006. With this assistance information, the UE 1006 may select and/or use the optimal transmit or receive beam to communicate with the base station 1004. In some implementations, the base station 1004 may select and/or use the optimal transmit or receive beam to communicate with the UE 1006.

In alternate embodiments, the call flow 1000 may perform arrow 1052, where the base station 1004 may send optical information (e.g., sensed features) from the base station 1004 to the UE 1006. In some embodiments, one or more images or video may be obtained using a sensor (e.g., camera) associated with the base station 1004. The UE 1006 may also obtain sensed features using a sensor (e.g., camera) associated with the UE 1006. The sensed features by the base station 1004 may be of the same points in the environment as those sensed by the UE 1006 so as to enable keypoint detection and determination of a unit vector based on detected keypoints.

In some cases, the base station's provision of the sensed features may be a one-time operation, with an assumption that the features do not change appreciably where the base station 1004 is static and intrinsic and/or extrinsic parameters of the sensor do not change.

In the alternate embodiments, the call flow 1000 may perform block 1054 without performing 1014-1018. At block 1054, the UE 1006 may determine a translation unit vector and determine assistance information based on the unit vector. Similar to block 1016, the unit vector may be determined based on keypoints within the sensed features (e.g., images) from the base station 1004 and the UE 1006 (e.g., using methods such as FAST, as discussed above). Based on the unit vector, the UE 1006 may determine information regarding transmit beams and/or receive beams (e.g., candidate beams, or optimal transmit and/or receive beams). With this information, the UE 1006 may select and/or use the optimal transmit or receive beam to communicate with the base station 1004.

In some implementations, the foregoing call flow 1000 may be applied to a first UE and a second UE for sidelink beamforming (e.g., to use with the FIG. 5 scenario).

Moreover, in other implementations, the aforementioned approach can be applied with an optical sensor at other electromagnetic wave frequencies, e.g., radar or lidar, to perform keypoint matching across radar or lidar images.

Methods

Figure 11:
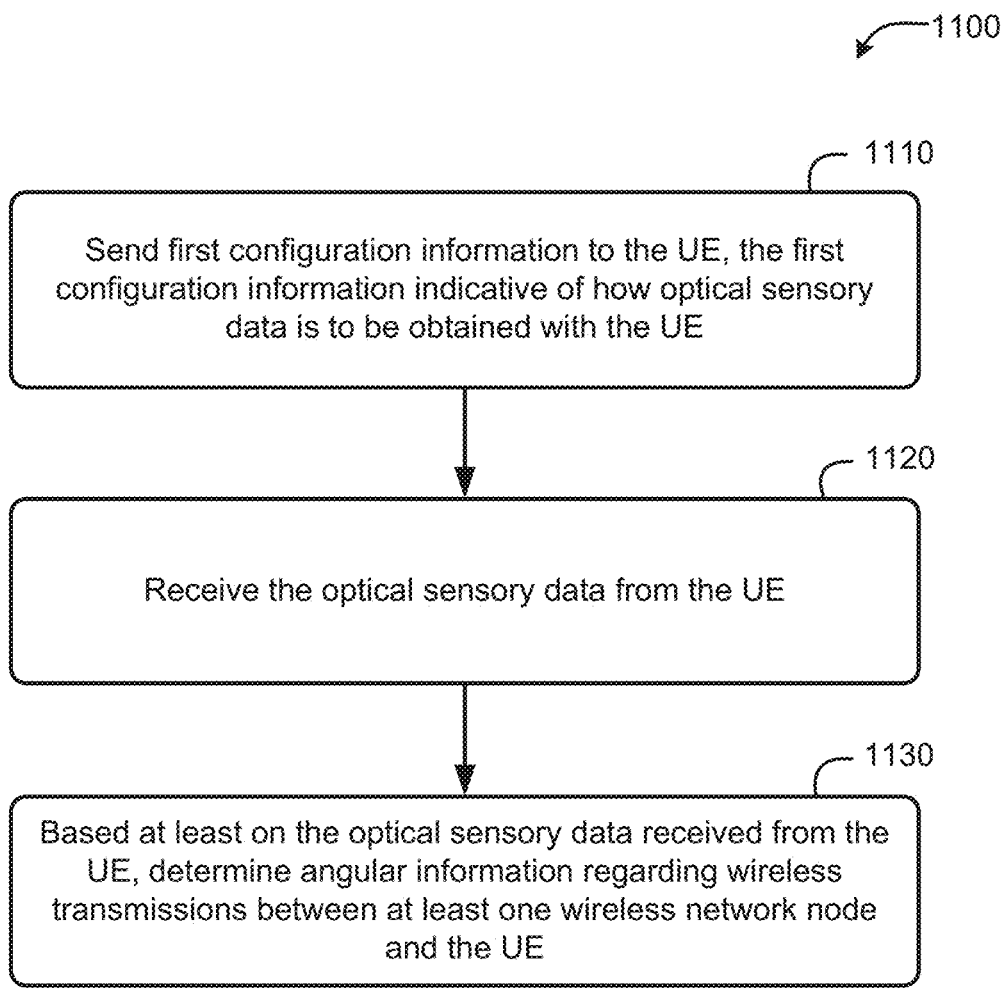
FIG. 11 is a flow diagram of a method of assisting positioning of a UE, according to an embodiment.
Figure 14:
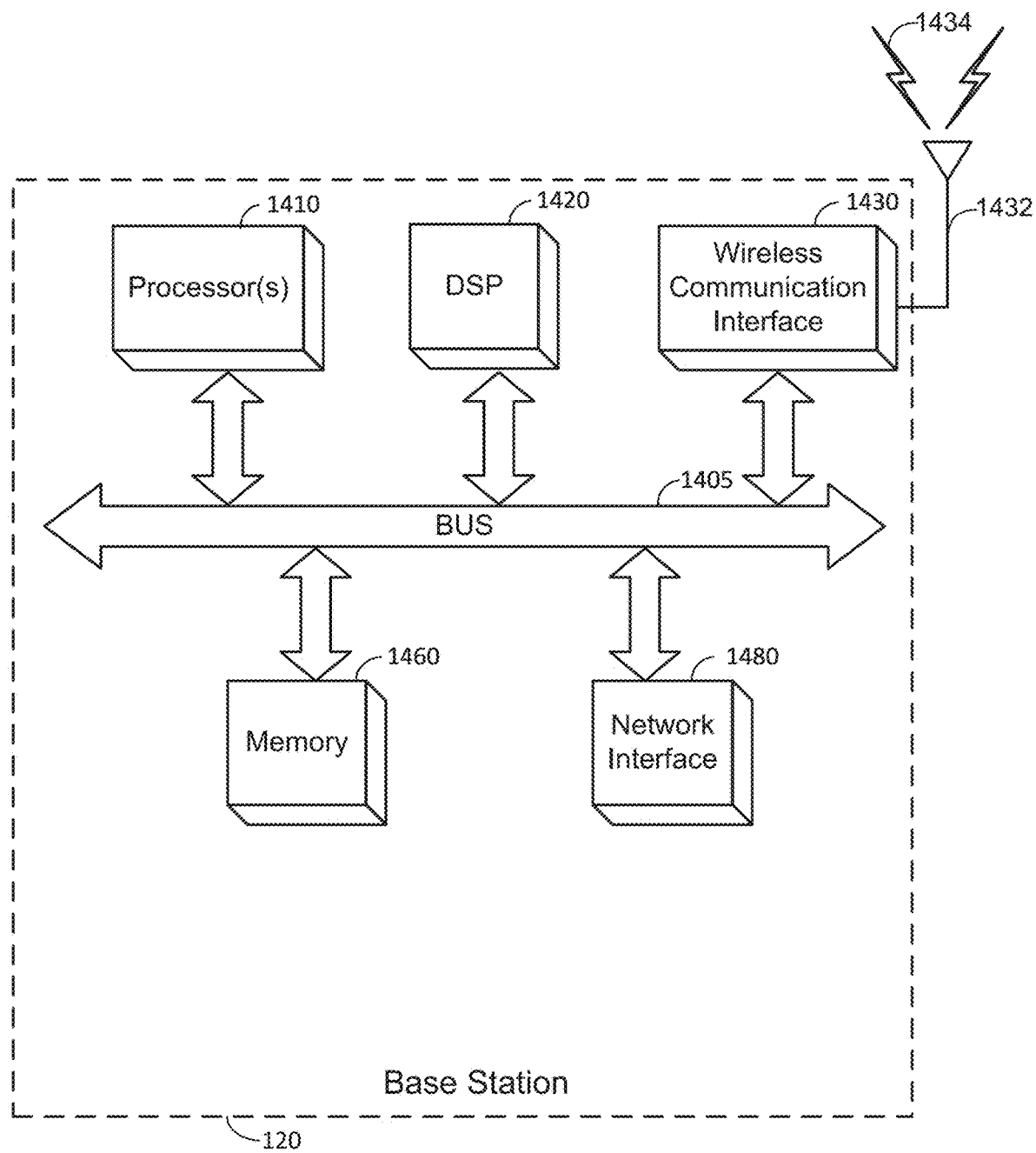
FIG. 14 is a block diagram of an embodiment of a base station, which can be utilized in embodiments as described herein.
Figure 15:
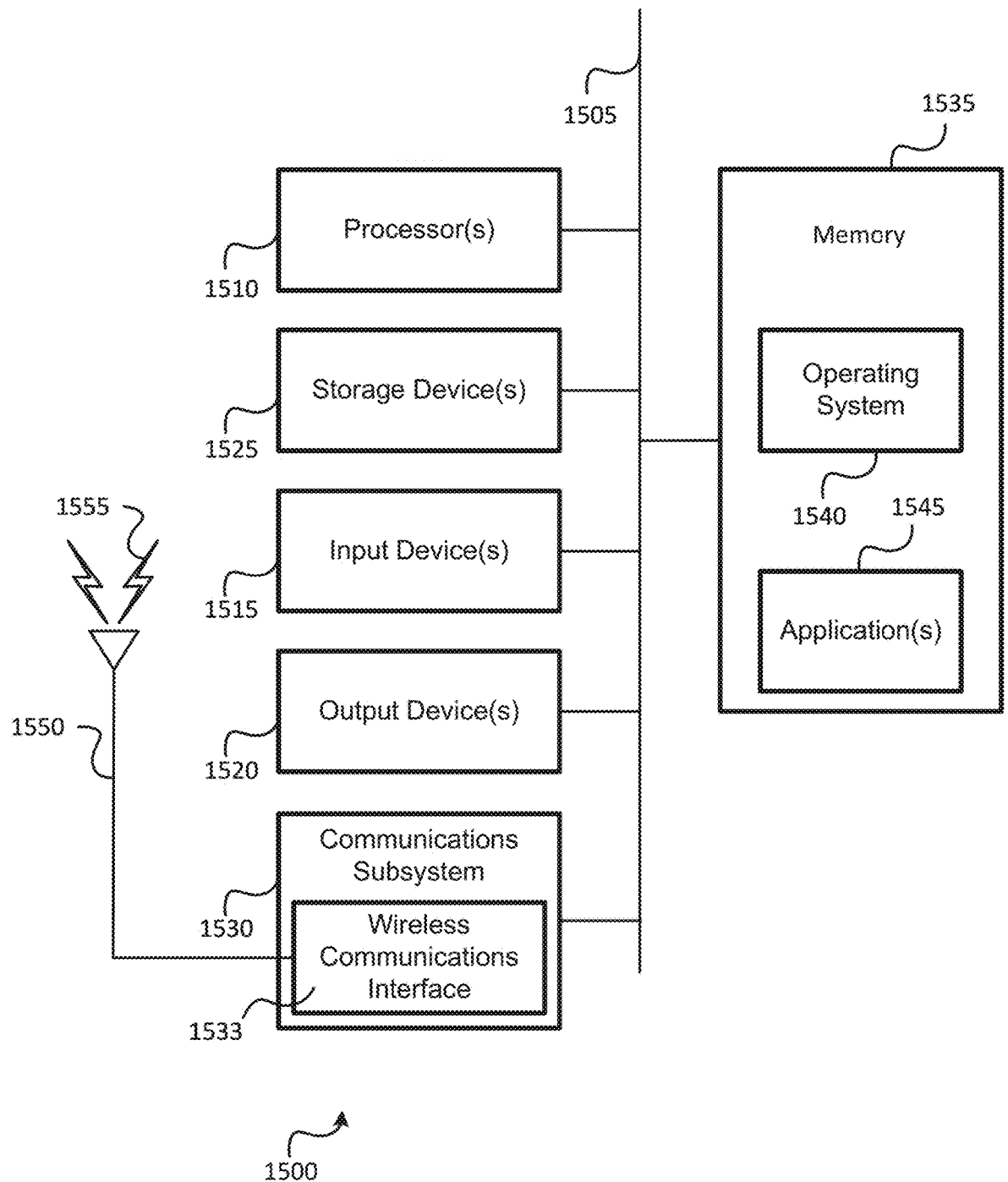
FIG. 15 is a block diagram of an embodiment of a computer system, which can be utilized in embodiments as described herein.

FIG. 11 is a flow diagram of a method 1100 of assisting positioning of a UE, according to an embodiment. Structure for performing the functionality illustrated in one or more of the blocks shown in FIG. 11 may include hardware and/or software components of a computerized apparatus or system, e.g., a server (e.g., location server) or a base station (e.g., gNB). Components of such computerized apparatus or system may include, for example, a controller apparatus, a computerized system, or a computer-readable apparatus including a storage medium storing computer-readable and/or computer-executable instructions that are configured to, when executed by a processor apparatus, cause the at least one processor apparatus or a computerized apparatus to perform the operations. Example components of a base station and a server are illustrated in FIGS. 14 and 15, which are described in more detail below.

It should also be noted that the operations of the method 1100 may be performed in any suitable order, not necessarily the order depicted in FIG. 11. Further, the method 1100 may include additional or fewer operations than those depicted in FIG. 11 to assist positioning of a UE.

At block 1110, the functionality may include sending first configuration information to the UE, the first configuration information indicative of how optical sensory data is to be obtained with the UE. In some embodiments, the first configuration information may include one or more of a method for detecting the one or more keypoints of the first visual information, a feature descriptor for the one or more keypoints of the first visual information, a quantity of the one or more keypoints of the first visual information, a first parameter (e.g., intrinsic or extrinsic camera parameters) associated with the image-capturing device associated with the UE, or a combination thereof. In some embodiments, configuration information may include a request to associate the one or more keypoints of the first visual information with a classification (e.g., to classify pixels in an image for classic semantic segmentation as discussed above).

Other configuration information may alternatively or additionally be included, e.g., one or more of: the number of keypoints to be provided based on an intensity metric for each keypoint specified as the sharpness of a corner, e.g., as used in the Harris corner measure; information (e.g., optical information such as images, features) to be obtained by the base station 904 and the UE 906, e.g., sensed information such as images and/or sensor intrinsic parameters; a request for the raw image or a compressed image itself; or a request for current location information of the base station and/or the UE.

In some implementations, the configuration information may request the keypoints to be tagged as static or dynamic associated with a probability, so that keypoints can be matched across the images more effectively, thereby enhancing positioning accuracy.

Means for performing functionality at block 1110 may comprise processor(s), wireless communication interface, and/or other components of a location server or base station, as illustrated in FIG. 14 or 15.

At block 1120, the functionality may include receiving the optical sensory data from the UE. In some embodiments, such optical sensory data may have been obtained in accordance with the first configuration information, with examples of the optical sensory data noted below.

Means for performing functionality at block 1120 may comprise processor(s), wireless communication interface, and/or other components of a location server or base station, as illustrated in FIG. 14 or 15.

At block 1130, the functionality may include, based at least on the optical sensory data received from the UE, determining angular information regarding wireless transmissions between at least one wireless network node (e.g., a base station such as a gNB) and the UE.

In some embodiments, the functionality further includes sending second configuration information to the at least one wireless network node, the second configuration information indicative of how optical sensory data is to be obtained with the at least one wireless network node. In some implementations, the optical sensory data received from the UE comprises first visual information (e.g., one or more images or frames) sensed by an image-capturing device (e.g., camera) associated with the UE, and the optical sensory data received from the at least one wireless network comprises second visual information (e.g., one or more images or frames) sensed by an image-capturing device (e.g., camera) associated with the at least one wireless network node.

In some implementations, the determining of the angular information may be further based on the optical sensory data received from the at least one wireless network node. For example, keypoint matching and unit vector determination may be performed at the location server using the optical sensory data from the UE and the wireless network node.

More specifically, in some embodiments, determining angular information may include determining keypoints associated with at least the optical sensory data received from the UE. Keypoints may be determined using a method described elsewhere herein (e.g., FAST, among others). Based on the keypoints, a vector may be determined which connects the wireless network node and the UE. The vector may be determined using a method described elsewhere herein (e.g., 8- or 5-point essential matrix decomposition). The vector provides the angular information, including direction to and AoA expected from the other node. With this angular information acting as assistance information for the UE, positioning may be performed even in NLOS.

In some cases, the first configuration information may further include a first time interval for sensing the first visual information, the second configuration information may further include a second time interval for sensing the second visual information, and the second time interval is shorter than the first time interval, e.g., since sensory features of the at least one wireless network node may be relatively static compared to those of the UE. In some implementations, the at least one wireless network node may report an absence of new information between sensing events.

In some scenarios, the location server may already have visual features from a prior transmission, or have access to them (assuming the wireless network node is relatively static and there is no change in intrinsic or extrinsic parameters of the sensor of the wireless network node). Then, the functionality may further include receiving subsequent optical sensory data from the UE but not from the at least one wireless network node, and determining subsequent angular information regarding wireless transmissions between the at least one wireless network node and the UE based on the optical sensory data received from the at least one wireless network node and the subsequent optical sensory data from the UE.

In some embodiments, the determining of the angular information regarding wireless transmissions between the at least one wireless network node and the UE includes: based on one or more keypoints of the first visual information and one or more keypoints of the second visual information, determining relative orientations between the image-capturing device associated with the at least one wireless network node, and the image-capturing device associated with the UE; and based on the relative orientations, determining a vector (e.g., translational unit vector) between the at least one wireless network node and the UE, the angular information determined based on the vector. In some cases, relative distance could be determined along with the relative orientations.

In some cases, the first parameter may include an indication of whether one or more parameters of the image-capturing device associated with the UE are static or dynamic, the second parameter may include an indication of whether one or more parameters of the image-capturing device associated with the at least one wireless network node are static or dynamic, and the determining of the relative orientations may be further based on the first and second parameters.

In some cases, the first configuration information may include a request to associate the one or more keypoints of the first visual information with a classification, the second configuration information may include a request to associate pixels within the one or more keypoints of the second visual information with a classification, and the determining of the relative orientations may be further based on the classifications.

In some embodiments, the functionality further includes determining an expected positioning metric based at least on the angular information regarding wireless transmissions between the at least one wireless network node and the UE. In some implementations, the expected positioning metric comprises an uplink AoA expected from the UE, or a downlink AoA expected from the at least one wireless network node, and the functionality further includes sending the expected uplink AoA to the at least one wireless network node, the expected uplink AoA configured to be used with positioning or beamforming with the UE; or sending the expected downlink AoA to the UE, the expected downlink AoA configured to be used with positioning or beamforming with the UE.

Means for performing functionality at block 1130 may comprise processor(s), and/or other components of a location server or base station, as illustrated in FIG. 14 or 15.

Figure 12:
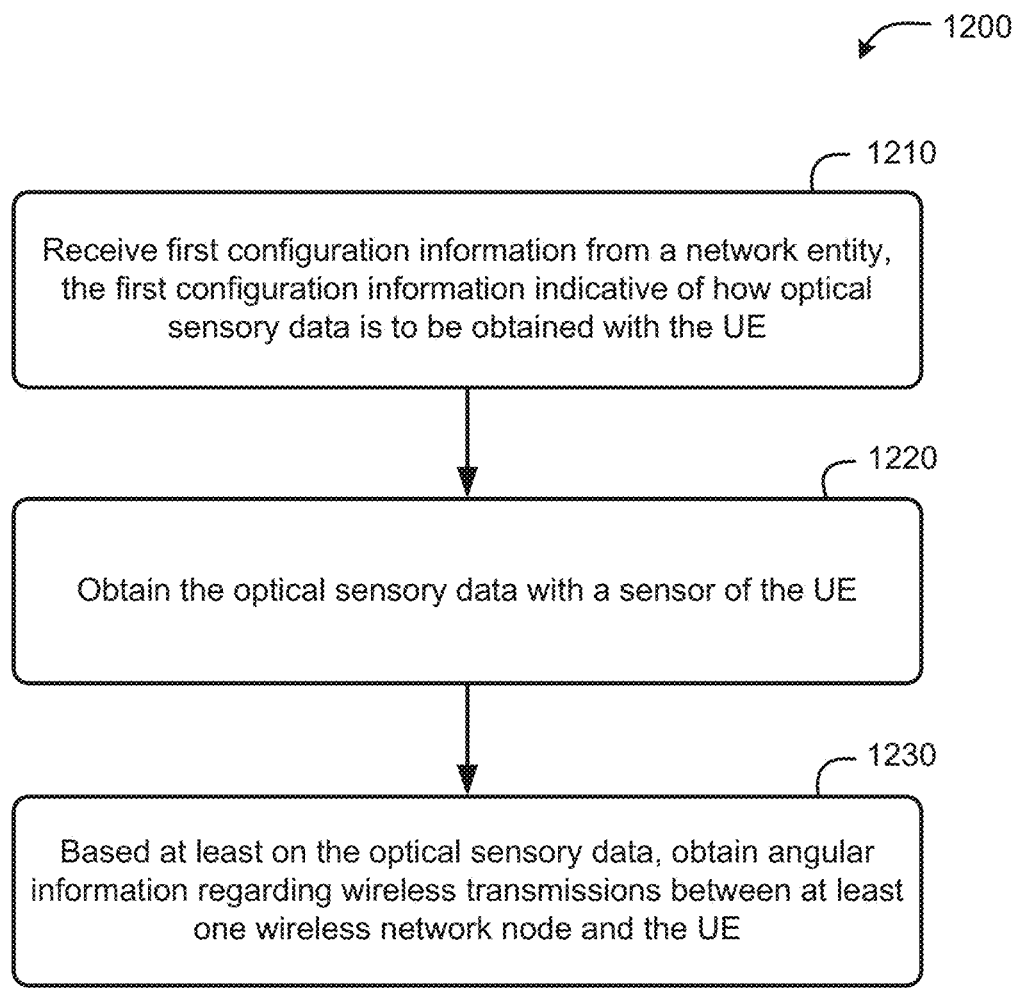
FIG. 12 is a flow diagram of a method of beam alignment with a UE, according to an embodiment.

FIG. 12 is a flow diagram of a method 1200 of beam alignment with a UE, according to an embodiment. Structure for performing the functionality illustrated in one or more of the blocks shown in FIG. 12 may include hardware and/or software components of a computerized apparatus or system, e.g., a UE. Components of such computerized apparatus or system may include, for example, a controller apparatus, a computerized system, or a computer-readable apparatus including a storage medium storing computer-readable and/or computer-executable instructions that are configured to, when executed by a processor apparatus, cause the at least one processor apparatus or a computerized apparatus to perform the operations. Example components of a UE are illustrated in FIG. 13, which are described in more detail below.

It should also be noted that the operations of the method 1200 may be performed in any suitable order, not necessarily the order depicted in FIG. 12. Further, the method 1200 may include additional or fewer operations than those depicted in FIG. 12 to perform beam alignment with a UE.

At block 1210, the functionality may include receiving first configuration information from a network entity, the first configuration information indicative of how optical sensory data is to be obtained with the UE.

Figure 13:
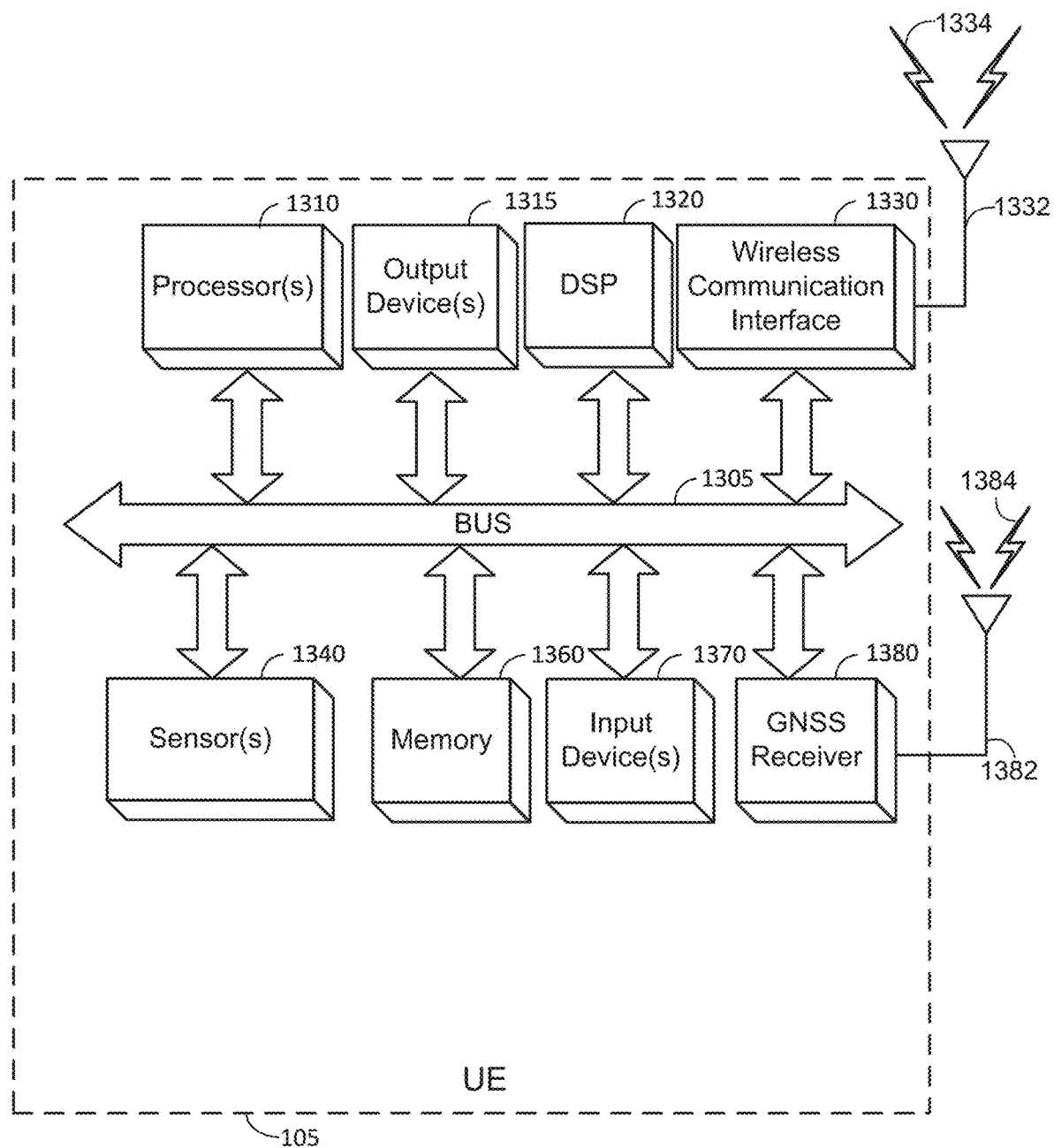
FIG. 13 is a block diagram of an embodiment of a UE, which can be utilized in embodiments as described herein.

Means for performing functionality at block 1210 may comprise processor(s), wireless communication interface, and/or other components of a UE, as illustrated in FIG. 13.

At block 1220, the functionality may include obtaining the optical sensory data with a sensor of the UE. In some embodiments, such optical sensory data may have been obtained in accordance with the first configuration information, with examples of the optical sensory data noted elsewhere herein.

Means for performing functionality at block 1220 may comprise processor(s), wireless communication interface, and/or other components of a UE, as illustrated in FIG. 13.

At block 1230, the functionality may include, based at least on the optical sensory data, obtaining angular information regarding wireless transmissions between at least one wireless network node and the UE.

In some embodiments, the functionality may further include sending the obtained optical sensory data to the network entity, the network entity comprising a location server, and the obtaining of the angular information may include receiving, from the location server, the angular information regarding wireless transmissions between the at least one wireless network node and the UE, the angular information determined based on optical sensory data obtained with a sensor of the at least one wireless network node, and the optical sensory data obtained with the sensor of the UE.

More specifically, in some embodiments, determining angular information may include determining keypoints associated with at least the optical sensory data obtained with the UE. Keypoints may be determined using a method described elsewhere herein (e.g., FAST, among others). Based on the keypoints, a vector may be determined which connects the wireless network node and the UE. The vector may be determined using a method described elsewhere herein (e.g., 8- or 5-point essential matrix decomposition). The vector provides the angular information, including direction to and AoA expected from the other node. With this angular information acting as assistance information for the UE, forming optimal transmit and receive beams that do not require extensive sweeping may be performed.

In specific cases, the angular information regarding wireless transmissions between the at least one wireless network node and the UE may include an expected downlink AoA expected from the at least one wireless network node, and the functionality may further include positioning the UE based on the expected downlink AoA.

In some variants, the obtaining of the angular information may include receiving, from the at least one wireless network node, an optimal transmit beam, an receive beam, or a combination thereof, to communicate with the at least one wireless network node, the angular information determined based on optical sensory data obtained with a sensor of the at least one wireless network node, and the optical sensory data obtained with the sensor of the UE.

In some variants, the functionality may further include receiving optical sensory data obtained with a sensor of the at least one wireless network node, wherein the network entity comprises the at least one wireless network node, and the obtaining of the angular information comprises determining the angular information regarding wireless transmissions between the at least one wireless network node and the UE based on the optical sensory data obtained with the sensor of the at least one wireless network node, and based on the optical sensory data obtained with the sensor of the UE.

Means for performing functionality at block 1230 may comprise processor(s), wireless communication interface, and/or other components of a UE, as illustrated in FIG. 13. Apparatus FIG. 13 is a block diagram of an embodiment of a UE 105, which can be utilized as described herein above (e.g., in association with FIGS. 6-12). For example, the UE 105 can perform one or more of the functions of the method shown in FIG. 12. It should be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 13.

The UE 105 is shown comprising hardware elements that can be electrically coupled via a bus 1305 (or may otherwise be in communication, as appropriate). The hardware elements may include a processor(s) 1310 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1310 may comprise one or more processing units, which may be housed in a single integrated circuit (IC) or multiple ICs. As shown in FIG. 13, some embodiments may have a separate DSP 1320, depending on desired functionality. Location determination and/or other determinations based on wireless communication may be provided in the processor(s) 1310 and/or wireless communication interface 1330 (discussed below). The UE 105 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The UE 105 may also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1330 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof. The antenna(s) 1332 may be capable of transmitting and receiving wireless signals using beams (e.g., Tx beams and Rx beams). Beam formation may be performed using digital and/or analog beam formation techniques, with respective digital and/or analog circuitry. The wireless communication interface 1330 may include such circuitry.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1340. Sensor(s) 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1380 capable of receiving signals 1384 from one or more GNSS satellites using an antenna 1382 (which could be the same as antenna 1332). Positioning based on GNSS signal measurement can be utilized to complement and/or incorporate the techniques described herein. The GNSS receiver 1380 can extract a position of the UE 105, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1380 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1380 is illustrated in FIG. 13 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1310, DSP 1320, and/or a processor within the wireless communication interface 1330 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1310 or DSP 1320.

The UE 105 may further include and/or be in communication with a memory 1360. The memory 1360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the UE 105 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the UE 105 (and/or processor(s) 1310 or DSP 1320 within UE 105). In some embodiments, then, such code and/or instructions can be used to configure and/or adapt a general-purpose computer (or other device) to perform one or more operations in accordance with the described methods.

FIG. 14 is a block diagram of an embodiment of a base station 120, which can be utilized as described herein above (e.g., in association with FIGS. 6-12). It should be noted that FIG. 14 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 1405 (or may otherwise be in communication, as appropriate). The hardware elements may include a processor(s) 1410 which can include without limitation one or more general-purpose processors, one or more special-purpose processors (such as DSP chips, graphics acceleration processors, ASICs, and/or the like), and/or other processing structure or means. As shown in FIG. 14, some embodiments may have a separate DSP 1420, depending on desired functionality. Location determination and/or other determinations based on wireless communication may be provided in the processor(s) 1410 and/or wireless communication interface 1430 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1430 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1432 that send and/or receive wireless signals 1434.

The base station 120 may also include a network interface 1480, which can include support of wireline communication technologies. The network interface 1480 may include a modem, network card, chipset, and/or the like. The network interface 1480 may include one or more input and/or output communication interfaces to permit data to be exchanged with a network, communication network servers, computer systems, and/or any other electronic devices described herein.

In many embodiments, the base station 120 may further comprise a memory 1460. The memory 1460 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1460 of the base station 120 also may comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the base station 120 (and/or processor(s) 1410 or DSP 1420 within base station 120). In some embodiments, then, such code and/or instructions can be used to configure and/or adapt a general-purpose computer (or other device) to perform one or more operations in accordance with the described methods.

FIG. 15 is a block diagram of an embodiment of a computer system 1500, which may be used, in whole or in part, to provide the functions of one or more network components as described in the embodiments herein (e.g., location server 160 of FIG. 1, LMF 220 of FIG. 2). It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner. In addition, it can be noted that components illustrated by FIG. 15 can be localized to a single device and/or distributed among various networked devices, which may be disposed at different geographical locations.

The computer system 1500 is shown comprising hardware elements that can be electrically coupled via a bus 1505 (or may otherwise be in communication, as appropriate). The hardware elements may include processor(s) 1510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1500 also may comprise one or more input devices 1515, which may comprise without limitation a mouse, a keyboard, a camera, a microphone, and/or the like; and one or more output devices 1520, which may comprise without limitation a display device, a printer, and/or the like.

The computer system 1500 may further include (and/or be in communication with) one or more non-transitory storage devices 1525, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1500 may also include a communications subsystem 1530, which may comprise wireless communication technologies managed and controlled by a wireless communication interface 1533, as well as wired technologies (such as Ethernet, coaxial communications, universal serial bus (USB), and the like). The wireless communication interface 1533 may comprise one or more wireless transceivers that may send and receive wireless signals 1555 (e.g., signals according to 5G NR or LTE) via wireless antenna(s) 1550. Thus the communications subsystem 1530 may comprise a modem, a network card (wireless or wired), an infrared communication device, a wireless communication device, and/or a chipset, and/or the like, which may enable the computer system 1500 to communicate on any or all of the communication networks described herein to any device on the respective network, including a User Equipment (UE), base stations and/or other TRPs, and/or any other electronic devices described herein. Hence, the communications subsystem 1530 may be used to receive and send data as described in the embodiments herein.

In many embodiments, the computer system 1500 will further comprise a working memory 1535, which may comprise a RAM or ROM device, as described above. Software elements, shown as being located within the working memory 1535, may comprise an operating system 1540, device drivers, executable libraries, and/or other code, such as one or more applications 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring,"

"performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of assisting positioning of a user equipment (UE), the method comprising: sending first configuration information to the UE, the first configuration information indicative of how optical sensory data is to be obtained with the UE; receiving the optical sensory data from the UE; and based at least on the optical sensory data received from the UE, determining angular information regarding wireless transmissions between at least one wireless network node and the UE.

Clause 2. The method of clause 1, further comprising sending second configuration information to the at least one wireless network node, the second configuration information indicative of how optical sensory data is to be obtained with the at least one wireless network node; wherein the determining of the angular information is further based on the optical sensory data received from the at least one wireless network node.

Clause 3. The method of any one of clauses 1-2 further comprising determining an expected positioning metric based at least on the angular information regarding wireless transmissions between the at least one wireless network node and the UE.

Clause 4. The method of any one of clauses 1-3 wherein the expected positioning metric comprises an uplink angle of arrival (AoA) expected from the UE, or a downlink AoA expected from the at least one wireless network node; and the method further comprises sending the uplink AoA to the at least one wireless network node, the uplink AoA configured to be used with positioning or beamforming with the UE; or sending the downlink AoA to the UE, the downlink AoA configured to be used with positioning or beamforming with the UE.

Clause 5. The method of any one of clauses 1-4 wherein the optical sensory data received from the UE comprises first visual information sensed by an image-capturing device associated with the UE, and the optical sensory data received from the at least one wireless network comprises second visual information sensed by an image-capturing device associated with the at least one wireless network node.

Clause 6. The method of any one of clauses 1-5 wherein the determining of the angular information regarding wireless transmissions between the at least one wireless network node and the UE comprises: based on one or more keypoints of the first visual information and one or more keypoints of the second visual information, determining relative orientations between the image-capturing device associated with the at least one wireless network node, and the image-capturing device associated with the UE; and based on the relative orientations, determining a vector between the at least one wireless network node and the UE, wherein the angular information is determined based on the vector.

Clause 7. The method of any one of clauses 1-6 wherein the first configuration information comprises a method for detecting the one or more keypoints of the first visual information, a feature descriptor for the one or more keypoints of the first visual information, a quantity of the one or more keypoints of the first visual information, a first parameter associated with the image-capturing device associated with the UE, or a combination thereof; and the second configuration information comprises a method for detecting the one or more keypoints of the second visual information, a feature descriptor for the one or more keypoints of the second visual information, a quantity of the one or more keypoints of the second visual information, a second parameter associated with the image-capturing device associated with the at least one wireless network node, or a combination thereof.

Clause 8. The method of any one of clauses 1-7 wherein the first parameter comprises an indication of whether one or more parameters of the image-capturing device associated with the UE are static or dynamic; the second parameter comprises an indication of whether one or more parameters of the image-capturing device associated with the at least one wireless network node are static or dynamic; and the determining of the relative orientations is further based on the first and second parameters.

Clause 9. The method of any one of clauses 1-8 wherein the first configuration information comprises a request to associate the one or more keypoints of the first visual information with a classification, and the second configuration information comprises a request to associate pixels within the one or more keypoints of the second visual information with a classification; and the determining of the relative orientations is further based on the classifications.

Clause 10. The method of any one of clauses 1-9 wherein the first configuration information further comprises a first time interval for sensing the first visual information; the second configuration information further comprises a second time interval for sensing the second visual information; and the second time interval is shorter than the first time interval.

Clause 11. The method of any one of clauses 1-10 further comprising receiving subsequent optical sensory data from the UE but not from the at least one wireless network node; and determining subsequent angular information regarding wireless transmissions between the at least one wireless network node and the UE based on the optical sensory data received from the at least one wireless network node and the subsequent optical sensory data from the UE.

Clause 12. The method of any one of clauses 1-11 further comprising selecting a subset of transmit beams or a subset of receive beams of the at least one wireless network node and the UE based on the expected positioning metric.

Clause 13. The method of any one of clauses 1-12 further comprising receiving a request for assistance data from the UE, wherein the sending of the first configuration information is responsive to the request for assistance data.

Clause 14. An apparatus of a wireless communication network, the apparatus comprising: one or more network interfaces; memory; and one or more processors communicatively coupled to the one or more network interfaces and the memory, and configured to: send first configuration information to a user equipment (UE), the first configuration information indicative of how optical sensory data is to be obtained with the UE; receive the optical sensory data from the UE; and based at least on the optical sensory data received from the UE, determine angular information regarding wireless transmissions between at least one wireless network node and the UE.

Clause 15. The apparatus of clause 14, wherein the one or more processors are further configured to send second configuration information to the at least one wireless network node, the second configuration information indicative of how optical sensory data is to be obtained with the at least one wireless network node; and wherein the determination of the angular information is further based on the optical sensory data received from the at least one wireless network node.

Clause 16. The apparatus of any one of clauses 14-15 wherein the one or more processors are further configured to determine an expected positioning metric based at least on the angular information regarding wireless transmissions between the at least one wireless network node and the UE; wherein: the expected positioning metric comprises an uplink angle of arrival (AoA) expected from the UE, or a downlink AoA expected from the at least one wireless network node; and the one or more processors are further configured to send the uplink AoA to the at least one wireless network node, the uplink AoA configured to be used with positioning or beamforming with the UE; or send the downlink AoA to the UE, the downlink AoA configured to be used with positioning or beamforming with the UE.

Clause 17. The apparatus of any one of clauses 14-16 wherein the optical sensory data received from the UE comprises first visual information sensed by an image-capturing device associated with the UE, and the optical sensory data received from the at least one wireless network node comprises second visual information sensed by an image-capturing device associated with the at least one wireless network node; and wherein, to determine the angular information regarding wireless transmissions between the at least one wireless network node and the UE, the one or more processors are further configured to: determine, based on one or more keypoints of the first visual information and one or more keypoints of the second visual information, relative orientations between the image-capturing device associated with the at least one wireless network node and the image-capturing device associated with the UE; and determine, based on the relative orientations, a vector between the at least one wireless network node and the UE; and determine the angular information determined based on the vector.

Clause 18. The apparatus of any one of clauses 14-17 wherein the first configuration information comprises a method for detecting the one or more keypoints of the first visual information, a feature descriptor for the one or more keypoints of the first visual information, a quantity of the one or more keypoints of the first visual information, a first parameter associated with the image-capturing device associated with the UE, or a combination thereof; and the second configuration information comprises a method for detecting the one or more keypoints of the second visual information, a feature descriptor for the one or more keypoints of the second visual information, a quantity of the one or more keypoints of the second visual information, a second parameter associated with the image-capturing device associated with the at least one wireless network node, or a combination thereof.

Clause 19. The apparatus of any one of clauses 14-18 the one or more processors are further configured to determine an expected positioning metric based at least on the angular information regarding wireless transmissions between the at least one wireless network node and the UE; and select a subset of transmit beams or a subset of receive beams of the at least one wireless network node and the UE based on the expected positioning metric.

Clause 20. The apparatus of any one of clauses 14-19 the one or more processors are further configured to receive a request for assistance data from the UE, and send the first configuration information in response to the request for assistance data.

Clause 21. A method of beam alignment with a user equipment (UE), the method comprising: receiving first configuration information from a network entity, the first configuration information indicative of how optical sensory data is to be obtained with the UE; obtaining the optical sensory data with a sensor of the UE; and based at least on the optical sensory data, obtaining angular information regarding wireless transmissions between at least one wireless network node and the UE.

Clause 22. The method of clause 21, further comprising sending the obtained optical sensory data to the network entity, the network entity comprising a location server; wherein the obtaining of the angular information comprises receiving, from the location server, the angular information regarding wireless transmissions between the at least one wireless network node and the UE, the angular information determined based on optical sensory data obtained with a sensor of the at least one wireless network node, and the optical sensory data obtained with the sensor of the UE.

Clause 23. The method of any one of clauses 21-22 wherein the angular information regarding wireless transmissions between the at least one wireless network node and the UE comprises an expected downlink angle of arrival (AoA) expected from the at least one wireless network node; and the method further comprises determining a position of the UE based on the expected downlink AoA.

Clause 24. The method of any one of clauses 21-23 wherein the obtaining of the angular information comprises receiving, from the at least one wireless network node, an optimal transmit beam, a receive beam, or a combination thereof, to communicate with the at least one wireless network node; the angular information is determined based on optical sensory data obtained with a sensor of the at least one wireless network node and the optical sensory data obtained with the sensor of the UE.

Clause 25. The method of any one of clauses 21-24 further comprising receiving optical sensory data obtained with a sensor of the at least one wireless network node; wherein:

the network entity comprises the at least one wireless network node; and the obtaining of the angular information comprises determining the angular information regarding wireless transmissions between the at least one wireless network node and the UE based on the optical sensory data obtained with the sensor of the at least one wireless network node, and based on the optical sensory data obtained with the sensor of the UE.

Clause 26. A user equipment (UE) comprising: one or more network interfaces; memory; a sensor; and one or more processors communicatively coupled to the one or more network interfaces, the sensor, and the memory, and configured to: receive first configuration information from a network entity, the first configuration information indicative of how optical sensory data is to be obtained with the UE; obtain the optical sensory data with the sensor of the UE; and based at least on the optical sensory data, obtain angular information regarding wireless transmissions between at least one wireless network node and the UE.

Clause 27. The UE of clause 26, wherein the one or more processors are further configured to send the obtained optical sensory data to the network entity, the network entity comprising a location server; and wherein, to obtain the angular information, the one or more processors are configured to: receive, from the location server, the angular information regarding wireless transmissions between the at least one wireless network node and the UE, the angular information determined based on optical sensory data obtained with a sensor of the at least one wireless network node and the optical sensory data obtained with the sensor of the UE.

Clause 28. The UE of any one of clauses 26-27 wherein the angular information regarding wireless transmissions between the at least one wireless network node and the UE comprises an expected downlink angle of arrival (AoA) expected from the at least one wireless network node; and the one or more processors are further configured to determine a position of the UE based on the expected downlink AoA.

Clause 29. The UE of any one of clauses 26-28 wherein, to obtain the angular information, the one or more processors are configured to receive, from the at least one wireless network node, an optimal transmit beam, a receive beam, or a combination thereof, to communicate with the at least one wireless network node; the angular information is determined based on optical sensory data obtained with a sensor of the at least one wireless network node and the optical sensor data obtained with the sensor of the UE.

Clause 30. The UE of any one of clauses 26-29 wherein the one or more processors are further configured to receive optical sensory data obtained with a sensor of the at least one wireless network node; wherein: the network entity comprises the at least one wireless network node; and to obtain the angular information, the one or more processors are configured to determine the angular information regarding wireless transmissions between the at least one wireless network node and the UE based on the optical sensory data obtained with the sensor of the at least one wireless network node and the optical sensory data obtained with the sensor of the UE.

What is claimed is:

1. A method of assisting positioning of a user equipment (UE), the method comprising:
sending first configuration information to the UE, the first configuration information indicative of how optical sensory data is to be obtained with the UE;
sending second configuration information to at least one wireless network node, the second configuration information indicative of how optical sensory data is to be obtained with the at least one wireless network node;
receiving optical sensory data from the UE;
receiving optical sensory data from the at least one wireless network node; and
based at least on the optical sensory data received from the UE and the optical sensory data received from the at least one wireless network node, determining angular information regarding wireless transmissions between the at least one wireless network node and the UE.

2. The method of claim 1, further comprising determining an expected positioning metric based at least on the angular information regarding wireless transmissions between the at least one wireless network node and the UE.

3. The method of claim 2, wherein:
the expected positioning metric comprises an uplink angle of arrival (AoA) expected from the UE, or a downlink AoA expected from the at least one wireless network node; and
the method further comprises sending the uplink AoA to the at least one wireless network node, the uplink AoA configured to be used with positioning or beamforming with the UE; or sending the downlink AoA to the UE, the downlink AoA configured to be used with positioning or beamforming with the UE.

4. The method of claim 2, further comprising selecting a subset of transmit beams or a subset of receive beams of the at least one wireless network node and the UE based on the expected positioning metric.

5. The method of claim 1, further comprising receiving a request for assistance data from the UE, wherein the sending of the first configuration information is responsive to the request for assistance data.

6. The method of claim 1, wherein the optical sensory data received from the UE comprises first visual information sensed by an image-capturing device associated with the UE, and the optical sensory data received from the at least one wireless network comprises second visual information sensed by an image-capturing device associated with the at least one wireless network node.

7. The method of claim 6, wherein the determining of the angular information regarding wireless transmissions between the at least one wireless network node and the UE comprises:
based on one or more keypoints of the first visual information and one or more keypoints of the second visual information, determining relative orientations between the image-capturing device associated with the at least one wireless network node, and the image-capturing device associated with the UE; and
based on the relative orientations, determining a vector between the at least one wireless network node and the UE, wherein the angular information is determined based on the vector.

8. The method of claim 7, wherein:
the first configuration information comprises a method for detecting the one or more keypoints of the first visual information, a feature descriptor for the one or more keypoints of the first visual information, a quantity of the one or more keypoints of the first visual information, a first parameter associated with the image-capturing device associated with the UE, or a combination thereof; and
the second configuration information comprises a method for detecting the one or more keypoints of the second visual information, a feature descriptor for the one or more keypoints of the second visual information, a quantity of the one or more keypoints of the second visual information, a second parameter associated with the image-capturing device associated with the at least one wireless network node, or a combination thereof.

9. The method of claim 8, wherein:
the first parameter comprises an indication of whether one or more parameters of the image-capturing device associated with the UE are static or dynamic;
the second parameter comprises an indication of whether one or more parameters of the image-capturing device associated with the at least one wireless network node are static or dynamic; and
the determining of the relative orientations is further based on the first and second parameters.

10. The method of claim 7, wherein:
the first configuration information comprises a request to associate the one or more keypoints of the first visual information with a first classification, and the second configuration information comprises a request to associate pixels within the one or more keypoints of the second visual information with a second classification; and
the determining of the relative orientations is further based on the first and second classifications.

11. The method of claim 6, wherein:
the first configuration information further comprises a first time interval for sensing the first visual information;
the second configuration information further comprises a second time interval for sensing the second visual information; and
the second time interval is shorter than the first time interval.

12. The method of claim 1, further comprising
receiving subsequent optical sensory data from the UE but not from the at least one wireless network node; and
determining subsequent angular information regarding wireless transmissions between the at least one wireless network node and the UE based on the optical sensory data received from the at least one wireless network node and the subsequent optical sensory data from the UE.

13. An apparatus of a wireless communication network, the apparatus comprising:
one or more network interfaces;
memory; and
one or more processors communicatively coupled to the one or more network interfaces and the memory, and configured to:
send first configuration information to a user equipment (UE), the first configuration information indicative of how optical sensory data is to be obtained with the UE;
send second configuration information to at least one wireless network node, the second configuration information indicative of how optical sensory data is to be obtained with the at least one wireless network node;
receive optical sensory data from the UE;
receive optical sensory data from the at least one wireless network node; and
based at least on the optical sensory data received from the UE and the optical sensory data received from the at least one wireless network node, determine angular information regarding wireless transmissions between the at least one wireless network node and the UE.

14. The apparatus of claim 13, wherein the one or more processors are further configured to determine an expected positioning metric based at least on the angular information regarding wireless transmissions between the at least one wireless network node and the UE;
wherein:
the expected positioning metric comprises an uplink angle of arrival (AoA) expected from the UE, or a downlink AoA expected from the at least one wireless network node; and
the one or more processors are further configured to send the uplink AoA to the at least one wireless network node, the uplink AoA configured to be used with positioning or beamforming with the UE; or send the downlink AoA to the UE, the downlink AoA configured to be used with positioning or beamforming with the UE.

15. The apparatus of claim 13, wherein:
the optical sensory data received from the UE comprises first visual information sensed by an image-capturing device associated with the UE, and the optical sensory data received from the at least one wireless network node comprises second visual information sensed by an image-capturing device associated with the at least one wireless network node; and
wherein, to determine the angular information regarding wireless transmissions between the at least one wireless network node and the UE, the one or more processors are further configured to:
determine, based on one or more keypoints of the first visual information and one or more keypoints of the second visual information, relative orientations between the image-capturing device associated with the at least one wireless network node and the image-capturing device associated with the UE; and
determine, based on the relative orientations, a vector between the at least one wireless network node and the UE; and
determine the angular information determined based on the vector.

16. The apparatus of claim 15, wherein:
the first configuration information comprises a method for detecting the one or more keypoints of the first visual information, a feature descriptor for the one or more keypoints of the first visual information, a quantity of the one or more keypoints of the first visual information, a first parameter associated with the image-capturing device associated with the UE, or a combination thereof; and
the second configuration information comprises a method for detecting the one or more keypoints of the second visual information, a feature descriptor for the one or more keypoints of the second visual information, a quantity of the one or more keypoints of the second visual information, a second parameter associated with the image-capturing device associated with the at least one wireless network node, or a combination thereof.

17. The apparatus of claim 13, the one or more processors are further configured to:
determine an expected positioning metric based at least on the angular information regarding wireless transmissions between the at least one wireless network node and the UE; and select a subset of transmit beams or a subset of receive beams of the at least one wireless network node and the UE based on the expected positioning metric.

18. The apparatus of claim 13, the one or more processors are further configured to receive a request for assistance data from the UE, and send the first configuration information in response to the request for assistance data.

19. An apparatus comprising:
  means for sending first configuration information to a user equipment (UE), the first configuration information indicative of how optical sensory data is to be obtained with the UE;
  means for sending second configuration information to at least one wireless network node, the second configuration information indicative of how optical sensory data is to be obtained with the at least one wireless network node;
  means for receiving optical sensory data from the UE;
  means for receiving optical sensory data from the at least one wireless network node; and
  means for, based at least on the optical sensory data received from the UE and the optical sensory data received from the at least one wireless network node, determining angular information regarding wireless transmissions between the at least one wireless network node and the UE.

20. The apparatus of claim 19, further comprising:
  means for determining an uplink angle of arrival (AoA) expected from the UE, or a downlink AoA expected from the at least one wireless network node, based at least on the angular information regarding wireless transmissions between the at least one wireless network node and the UE; and
  means for sending the uplink AoA to the at least one wireless network node, the uplink AoA configured to be used with positioning or beamforming with the UE; or sending the downlink AoA to the UE, the downlink AoA configured to be used with positioning or beamforming with the UE.

21. The apparatus of claim 19, wherein the optical sensory data received from the UE comprises first visual information sensed by an image-capturing device associated with the UE, and the optical sensory data received from the at least one wireless network comprises second visual information sensed by an image-capturing device associated with the at least one wireless network node.

22. The apparatus of claim 21, wherein the means for determining the angular information regarding wireless transmissions between the at least one wireless network node and the UE comprise:
  means for, based on one or more keypoints of the first visual information and one or more keypoints of the second visual information, determining relative orientations between the image-capturing device associated with the at least one wireless network node, and the image-capturing device associated with the UE; and
  means for, based on the relative orientations, determining a vector between the at least one wireless network node and the UE, wherein the angular information is determined based on the vector.

23. A non-transitory computer-readable apparatus comprising a storage medium, the storage medium comprising a plurality of instructions configured to, when executed by one or more processors, cause an apparatus to:
  send first configuration information to a user equipment (UE), the first configuration information indicative of how optical sensory data is to be obtained with the UE;
  send second configuration information to at least one wireless network node, the second configuration information indicative of how optical sensory data is to be obtained with the at least one wireless network node;
  receive optical sensory data from the UE;
  receive optical sensory data from the at least one wireless network node; and
  based at least on the optical sensory data received from the UE and the optical sensory data received from the at least one wireless network node, determine angular information regarding wireless transmissions between the at least one wireless network node and the UE.

24. The non-transitory computer-readable apparatus of claim 23, wherein the plurality of instructions are further configured to, when executed by the one or more processors, cause the apparatus to:
  determine an uplink angle of arrival (AoA) expected from the UE, or a downlink AoA expected from the at least one wireless network node, based at least on the angular information regarding wireless transmissions between the at least one wireless network node and the UE; and
  send the uplink AoA to the at least one wireless network node, the uplink AoA configured to be used with positioning or beamforming with the UE; or sending the downlink AoA to the UE, the downlink AoA configured to be used with positioning or beamforming with the UE.

25. The non-transitory computer-readable apparatus of claim 23, wherein the optical sensory data received from the UE comprises first visual information sensed by an image-capturing device associated with the UE, and the optical sensory data received from the at least one wireless network comprises second visual information sensed by an image-capturing device associated with the at least one wireless network node.

26. The non-transitory computer-readable apparatus of claim 25, wherein the determination of the angular information regarding wireless transmissions between the at least one wireless network node and the UE comprises:
  based on one or more keypoints of the first visual information and one or more keypoints of the second visual information, determination of relative orientations between the image-capturing device associated with the at least one wireless network node, and the image-capturing device associated with the UE; and
  based on the relative orientations, determination of a vector between the at least one wireless network node and the UE, wherein the angular information is determined based on the vector.

* * * * *